(12) United States Patent
Bando et al.

(10) Patent No.: US 12,407,178 B2
(45) Date of Patent: Sep. 2, 2025

(54) ELECTRIC POWER CONTROL SYSTEM AND POWER SUPPLY SYSTEM

(71) Applicant: KAWASAKI JUKOGYO KABUSHIKI KAISHA, Kobe (JP)

(72) Inventors: Soichiro Bando, Kobe (JP); Ryosuke Goto, Kobe (JP); Yusuke Umezu, Kobe (JP); Atsumori Yoshikawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 669 days.

(21) Appl. No.: 17/637,534

(22) PCT Filed: Jul. 9, 2020

(86) PCT No.: PCT/JP2020/026868
§ 371 (c)(1),
(2) Date: Feb. 23, 2022

(87) PCT Pub. No.: WO2021/039144
PCT Pub. Date: Mar. 4, 2021

(65) Prior Publication Data
US 2022/0271553 A1    Aug. 25, 2022

(30) Foreign Application Priority Data
Aug. 23, 2019    (JP) .................... 2019-152471

(51) Int. Cl.
*H02J 7/00*    (2006.01)
*H02J 3/16*    (2006.01)
(Continued)

(52) U.S. Cl.
CPC ............ *H02J 7/00712* (2020.01); *H02J 3/16* (2013.01); *H02J 3/38* (2013.01); *H02M 7/68* (2013.01); *H02J 2207/20* (2020.01)

(58) Field of Classification Search
CPC .. H02J 7/00712; H02J 3/16; H02J 3/38; H02J 2207/20; H02J 3/322; H02J 2207/40;
(Continued)

(56) References Cited

U.S. PATENT DOCUMENTS 4,277,692 A * 7/1981 Small ................. H02J 9/062
                                                363/133
10,263,429 B2 * 4/2019 Ohashi .................. H02J 3/381
(Continued)

FOREIGN PATENT DOCUMENTS

EP         3309952 A1 *  4/2018 ............ B64D 41/00
JP      2004072973 A  *  3/2004 ............ H01M 10/44
(Continued)

OTHER PUBLICATIONS

Power Storage Device and Hybrid Distributed Power System (Machine Translation for JP 2006141093 A to Goto et al., (Year: 2006).*
(Continued)

*Primary Examiner* — M Baye Diao
(74) *Attorney, Agent, or Firm* — Oliff PLC

(57) ABSTRACT

An electric power control system includes: a bidirectional electric power converter including AC and DC terminals, the AC terminal being connected to an AC power system, the DC terminal being connected to a DC power system to which one or more DC power loads are connected, the bidirectional electric power converter mutually converting AC power of the AC power system and DC power of the DC power system; an electric power storage that is connected to the DC power system and stores electric power of the DC power system; and a bidirectional electric power conversion controller that performs first control of controlling an output or input of the AC terminal of the bidirectional electric power converter such that a charge current, discharge current, charge electric power, or discharge electric power of
(Continued)

the electric power storage coincides with a predetermined target current value or a predetermined target electric power value.

11 Claims, 14 Drawing Sheets

(51) Int. Cl.
  *H02J 3/38* (2006.01)
  *H02M 7/68* (2006.01)

(58) Field of Classification Search
  CPC .. H02J 2310/46; H02J 7/00; H02J 7/10; H02J 3/01; H02J 3/24; H02J 3/32; H02M 7/68; B63H 21/17; Y02E 40/30; Y02E 40/40
  USPC .......................................................... 320/134
  See application file for complete search history.

(56) References Cited

U.S. PATENT DOCUMENTS

| | | | | |
|---|---|---|---|---|
| 10,919,399 | B2* | 2/2021 | Kotani | ....................... H02J 7/00 |
| 2009/0295162 | A1* | 12/2009 | Oohara | ....................... H02J 7/34 |
| | | | | 290/44 |
| 2013/0043844 | A1 | 2/2013 | Tashiro | |
| 2017/0250538 | A1* | 8/2017 | Wang | ..................... H02M 7/537 |
| 2019/0334352 | A1* | 10/2019 | Sugimoto | ............... H02M 7/48 |

FOREIGN PATENT DOCUMENTS

| | | | | | |
|---|---|---|---|---|---|
| JP | 2006141093 | A | * | 6/2006 | ................ H02J 3/38 |
| JP | 2006287998 | A | * | 10/2006 | ................ H02J 7/34 |
| JP | 2010-270758 | A | | 12/2010 | |
| JP | 2013138540 | A | * | 7/2013 | ................ H02J 3/32 |
| JP | 2013-172600 | A | | 9/2013 | |
| JP | 2014-64357 | A | | 4/2014 | |
| JP | 2016-055850 | A | | 4/2016 | |
| JP | 2018-107991 | A | | 7/2018 | |
| WO | 2013/099957 | A1 | | 7/2013 | |

OTHER PUBLICATIONS

JP2013138540A Power Conversion Device (Machine Translation of Description) (Year: 2013).*
P. C. Kushwaha et al., "Single-Phase Rooftop Photovoltaic based Grid-Interactive Electricity System", IEEE, pp. 1-6, (2016).
Arnaldo Aracibia et al., "Autonomous Control of Electric Vehicles in Grid-connected and Islanded Modes", 3rd IEEE PES Innovative Smart Grid Technologies Europe (ISGT Europe), Berlin, (2012), pp. 1-7.

* cited by examiner

ELECTRIC POWER CONTROL SYSTEM AND POWER SUPPLY SYSTEM

CROSS-REFERENCE TO RELATED APPLICATIONS

This is a National Phase of International Patent Application No. PCT/JP2020/026868 filed Jul. 9, 2020, which in turn claims the benefit of Japanese Patent Application No. 2019-152471 filed Aug. 23, 2019. The disclosure of the prior applications is hereby incorporated by reference herein in its entirety.

TECHNICAL FIELD

The present invention relates to an electric power control system and a power supply system.

BACKGROUND ART

Known as a conventional electric power control system is a method of controlling a propulsion system of a movable body, the method being able to, when short-cycle load fluctuation occurs, suppress an influence of the load fluctuation on an electric power system (see PTL 1).

The method of controlling the propulsion system of the movable body includes: subjecting a first power converter to drooping control based on a first electric power command value such that a point indicated by a frequency of the electric power system and system supplied/received electric power is located on a drooping characteristic line showing a relation between a target value of the frequency of the electric power system and a target value of the system supplied/received electric power; and controlling a second power converter based on a second electric power command value such that electric power converted by the second power converter becomes the second command value. The first electric power command value is generated by removing a fluctuation component from an original electric power command value that is a commanded electric power value or an electric power command value generated based on a commanded revolution value of a motor generator. The second electric power command value is based on the original electric power command value.

CITATION LIST

Patent Literature

PTL 1: Japanese Laid-Open Patent Application Publication No. 2016-055850 (see the abstract)

SUMMARY OF INVENTION

Technical Problem

In the above conventional method of controlling the propulsion system of the movable body, a DC power load connected to a DC terminal of the first power converter needs to be a special load that is a motor generator connected to the DC terminal of the first power converter through the second power converter. Therefore, PTL 1 does not describe a method of controlling a propulsion system of a movable body, the method being able to suppress an influence of load fluctuation on an (AC) electric power system when: a general DC power load other than a motor generator connected through a (second) electric power converter (hereinafter simply referred to as a "general DC power load") is connected to a DC terminal of a (first) electric power converter including an AC terminal connected to an AC power system; and short-cycle (sudden) load fluctuation occurs at the general DC power load.

The present invention was made to solve the above problem, and an object of the present invention is to provide an electric power control system and a power supply system, each of which includes a bidirectional electric power converter connected between an AC power system and a DC power system and is able to, when sudden load fluctuation occurs at a general DC power load, suppress an influence of the load fluctuation on the AC power system.

Solution to Problem

An electric power control system according to an aspect of the present invention includes: a bidirectional electric power converter including an AC terminal and a DC terminal, the AC terminal being connected to an AC power system, the DC terminal being connected to a DC power system to which one or more DC power loads are connected, the bidirectional electric power converter mutually converting AC power of the AC power system and DC power of the DC power system; an electric power storage that is connected to the DC power system and stores electric power of the DC power system; and a bidirectional electric power conversion controller that performs first control of controlling an output or input of the AC terminal of the bidirectional electric power converter such that a charge current, discharge current, charge electric power, or discharge electric power of the electric power storage coincides with a predetermined target current value or a predetermined target electric power value.

Advantageous Effects of Invention

The present invention can provide an electric power control system and a power supply system, each of which includes a bidirectional electric power converter connected between an AC power system and a DC power system and is able to, when sudden load fluctuation occurs at a general DC power load, suppress an influence of the load fluctuation on the AC power system.

DESCRIPTION OF EMBODIMENTS

Hereinafter, embodiments of the present application will be described with reference to the drawings. In the following description and the drawings, the same reference signs are used for the same or corresponding components, and the repetition of the same explanation is avoided. The present application is not limited to the embodiments below.

Embodiment 1

Configuration

Figure 1:
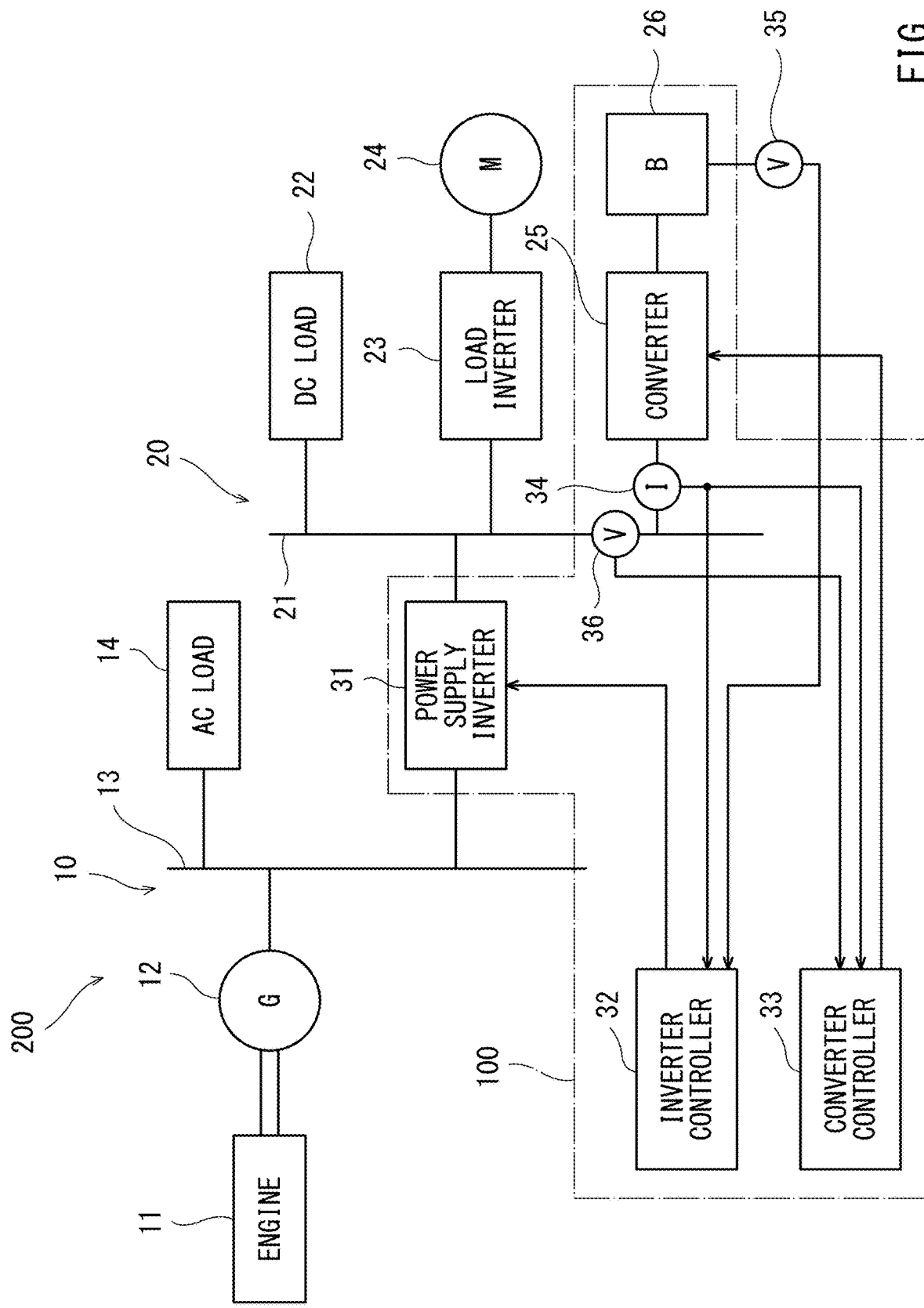
FIG. 1 is a block diagram showing the configuration of a power supply system according to Embodiment 1 of the present application.

FIG. 1 is a block diagram showing the configuration of a power supply system according to Embodiment 1 of the present application. As shown in FIG. 1, a power supply system 200 of Embodiment 1 includes an AC power system 10, a DC power system 20, and an electric power control system 100.

The power supply system 200 may be a microgrid including an AC power system and a DC power system. The AC power system may be a commercial system (an electric power system of an electric power company). Examples of the power supply system 200 include: electric power supply systems of ships, vehicles, aircrafts, and helicopters; and microgrids. An installation location of the microgrid is not limited to a position on a movable body and may be a position on ground (land).

Herein, the AC power system 10 transmits three-phase AC power. The AC power system 10 includes a bus line 13. For example, a power generator 12 and one or more general AC power loads (hereinafter abbreviated as "AC loads") 14 are connected to the bus line 13. A driving source of the power generator 12 is not especially limited. Herein, the driving source of the power generator 12 is an engine 11. FIG. 1 shows only one AC load 14. Examples of the AC loads 14 include various electrical apparatuses and lighting apparatuses.

The DC power system 20 includes a bus line 21. For example, one or more general DC power loads (hereinafter abbreviated as "DC loads") 22 are connected to the bus line 21, and an AC motor 24 is connected to the bus line 21 through a load inverter 23. FIG. 1 shows only one DC load 22. Examples of the DC loads include: electrical apparatuses for both AC and DC; lighting apparatuses; and DC motors. Hereinafter, the DC load 22, the load inverter 23, and the AC motor 24 will be collectively called a DC power load (22 to 24) and will be described together.

The electric power control system 100 includes: a bidirectional electric power converter (31) including an AC terminal and a DC terminal, the AC terminal being connected to the AC power system, the DC terminal being connected to the DC power system 20 to which one or more DC power loads (22 to 24) are connected, the bidirectional electric power converter (31) mutually converting AC power of the AC power system 10 and DC power of the DC power system 20; an electric power storage (25, 26) that is connected to the DC power system 20 and stores electric power of the DC power system 20; and a bidirectional electric power conversion controller (32) that performs first control of controlling an output or input of the AC terminal of the bidirectional electric power converter (31) such that a charge current, discharge current, charge electric power, or discharge electric power of the electric power storage (25, 26) coincides with a predetermined target current value IBt (see FIG. 2) or a predetermined target electric power value. As an example, the following will describe a case where as the first control, the bidirectional electric power conversion controller (32) controls the output or input of the AC terminal of the bidirectional electric power converter (31) such that the charge current or discharge current of the electric power storage (25, 26) coincides with the predetermined target current value IBt (see FIG. 2).

A case where as the first control, the bidirectional electric power conversion controller (32) controls the output or input of the AC terminal of the bidirectional electric power converter (31) such that the charge electric power or discharge electric power of the electric power storage (25, 26) coincides with the predetermined target electric power value can also be performed in the same manner as the following case with reference to the following description.

Specifically, the electric power control system 100 includes a converter 25, a battery 26, a power supply inverter 31, an inverter controller 32, a converter controller 33, a battery ammeter 34, a battery voltmeter 35, and a DC power system voltmeter 36. The converter 25 and the battery 26 constitute an electric power storage that stores DC power of the DC power system 20.

The battery 26 is one example of an electric power storage device. Examples of the electric power storage device includes batteries (secondary batteries) and capacitors. Herein, the battery is used as the electric power storage device. The battery 26 is connected to the bus line 21 of the DC power system 20 through the converter 25. The battery 26 is disposed to suppress the fluctuation of the voltage of the DC power system 20. Specifications (capacity, rated voltage, etc.) of the battery 26 are suitably determined in accordance with a reference voltage, capacity, and the like of the DC power system 20.

The converter 25 is constituted by, for example, a DC/DC converter. The converter 25 is controlled by the converter controller 33 to convert the voltage of the battery 26 to a predetermined voltage (target voltage value) by a voltage increase or a voltage decrease. Herein, the target voltage value is the reference voltage of the DC power system 20. The converter (DC/DC converter) 25 is constituted by, for example, a DC chopper, and changes a duty ratio to control a ratio of the voltage increase or the voltage decrease.

The battery ammeter 34 is disposed between the bus line 21 and the converter 25 and measures a current flowing from the battery 26 toward the bus line 21. This current is hereinafter called a battery current. The battery ammeter 34 may be disposed between the converter 25 and the battery 26. In this case, a battery current IBm is corrected in accordance with the ratio of the voltage increase or the voltage decrease performed by the converter 25.

The battery voltmeter 35 measures the voltage of the battery 26.

The DC power system voltmeter 36 measures the voltage of the bus line 21. This measured voltage is hereinafter called a DC power system voltage.

The converter controller 33 controls the operation of the converter 25 based on a DC power system voltage VDm and the battery current IBm. The converter controller 33 is constituted by, for example, a calculator (not shown) including a processor (not shown) and a memory (not shown). One example of the calculator is a microcontroller. Examples of the processor include CPUs, MPUs, FPGAs (Field Programmable Gate Arrays), and PLCs (Programmable Logic Controllers). Examples of the memory include: internal memories of processors, such as ROMs and RAMs; and external memories, such as hard disc drives. The below-described control of the converter 25 is performed in such a manner that the processor reads and executes a predetermined converter control program stored in the memory.

The power supply inverter 31 is one example of the bidirectional electric power converter. In Embodiment 1, the bidirectional electric power converter is used to mutually convert the AC power of the AC power system 10 and the DC power of the DC power system 20. Examples of the bidirectional electric power converter include bidirectional inverters and cycloconverters. In Embodiment 1, the bidirectional inverter is used as the power supply inverter 31. The power supply inverter 31 may be a voltage inverter or a current inverter. Herein, the voltage inverter is used as the power supply inverter 31.

An AC terminal of the power supply inverter 31 is connected to the AC power system 10, and a DC terminal of the power supply inverter 31 is connected to the DC power system 20. The power supply inverter 31 is controlled by the inverter controller 32 to mutually convert the AC power of the AC power system 10 and the DC power of the DC power system 20. Moreover, the power supply inverter 31 is linked to (is operated in synchronization with) the AC power system 10.

The inverter controller 32 is one example of the bidirectional electric power conversion controller. The inverter controller 32 controls the operation of the power supply inverter 31 based on the battery current IBm and a battery voltage VBm.

The inverter controller 32 is constituted by, for example, a calculator (not shown) including a processor (not shown) and a memory (not shown). One example of the calculator is a microcontroller. Examples of the processor include CPUs, MPUs, FPGAs (Field Programmable Gate Arrays), and PLCs (Programmable Logic Controllers). Examples of the memory include: internal memories of processors, such as ROMs and RAMs; and external memories, such as hard disc drives. The below-described control of the power supply inverter 31 is performed in such a manner that the processor reads and executes a predetermined converter control program stored in the memory. The inverter controller 32 and the converter controller 33 may be constituted by a single calculator.

Configuration of Inverter Controller 32

Configuration Related to Electric Power Conversion Control

Figure 2:
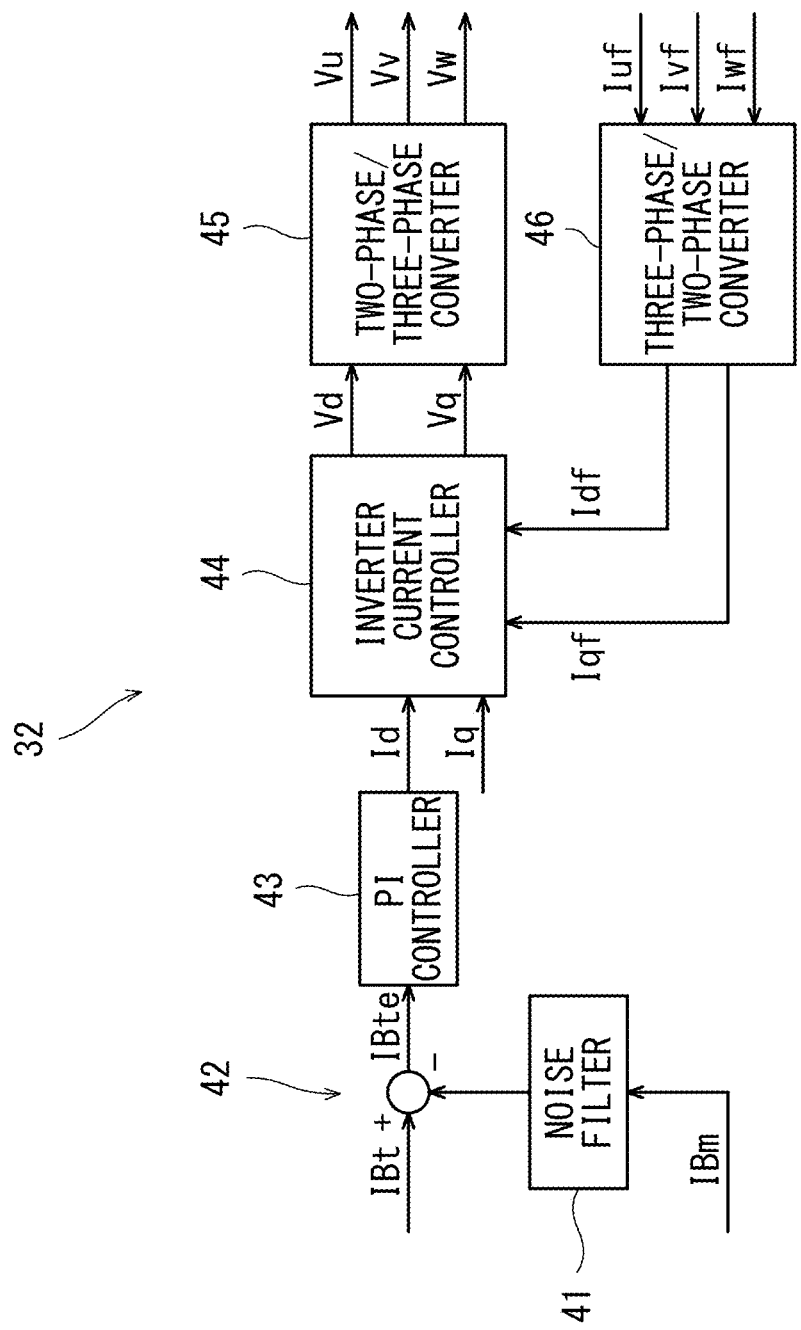
FIG. 2 is a block diagram showing the configuration related to electric power conversion control of an inverter controller of FIG. 1.

First, the configuration related to electric power conversion control will be described. FIG. 2 is a block diagram showing the configuration related to the electric power conversion control of the inverter controller 32 of FIG. 1. As shown in FIG. 2, the inverter controller 32 includes a noise filter 41, a subtracter 42, a PI controller 43, an inverter current controller 44, a two-phase/three-phase converter 45, and a three-phase/two-phase converter 46.

The noise filter 41 eliminates noise of the battery current IBm.

The subtracter 42 subtracts the battery current IBm, from which the noise has been eliminated, from a predetermined target current value IBt of the battery current to generate a current deviation IBte. Herein, the predetermined target current value IBt of the battery current IBm is a current value that should be maintained when the battery current IBm is in a steady state.

The PI controller 43 subjects the current deviation IBte to PI control to generate a d-axis current command value Id. A d-axis represents an active electric power component of the AC power output from the power supply inverter 31, and a q-axis represents a reactive electric power component of the AC power output from the power supply inverter 31.

The inverter current controller 44 generates a d-axis voltage command value Vd and a q-axis voltage command value Vq based on the d-axis current command value Id, a q-axis current command value Iq, a d-axis current Idf, and a q-axis current Iqf. The d-axis current Idf and the q-axis current Iqf are input to the inverter current controller 44 from the three-phase/two-phase converter 46. The q-axis current command value Iq is typically zero but may be a value that compensates reactive electric power generated by an LCL filter included in an AC output portion of the power supply inverter 31. The d-axis current Idf and the q-axis current Iqf are currents obtained by converting measured values of a three-phase alternating current output by the power supply inverter 31 into two phases that are the d-axis and the q-axis. Specifically, the inverter current controller 44 subjects the current deviation of the d-axis current Idf with respect to the d-axis current command value Id and the current deviation of the q-axis current Iqf with respect to the q-axis current command value Iq to predetermined control compensation to generate the d-axis voltage command value Vd and the q-axis voltage command value Vq.

The two-phase/three-phase converter 68 converts the d-axis voltage command value Vd and the q-axis voltage command value Vq into three-phase voltage command values that are a U-phase voltage command value Vuc, a V-phase voltage command value Vvc, and a W-phase voltage command value Vwc and outputs the U-phase voltage command value Vuc, the V-phase voltage command value Vvc, and the W-phase voltage command value Vwc to the power supply inverter 31.

The power supply inverter 31 converts the DC voltage (DC power) of the DC power system 20 into the AC voltage (AC power) of the AC power system 10 based on the three-phase voltage command values.

A three-phase current sensor (not shown) measures the current values of the converted AC power, and the measured three-phase current values (Iuf, Ivf, and Iwf) are converted into the d-axis current Idf and the q-axis current Iqf by the three-phase/two-phase converter 69.

As a result of this control, the DC power of the DC power system 20 is converted into the AC power of the AC power system 10 such that the battery current IBm coincides with the predetermined target current value IBt. When the d-axis current Idf is a positive value, the DC power of the DC power system 20 is converted into the AC power of the AC power system 10. When the d-axis current Idf is a negative value, the AC power of the AC power system 10 is converted into the DC power of the DC power system 20.

As shown in FIG. 2, the subtracter 42 and the PI controller 43 constitute a controller (hereinafter referred to as a "battery current controller") that controls the battery current IBm. The degree to which the battery 26 absorbs the load fluctuation changes depending on a response speed of the battery current controller (42, 43). When the response speed of the battery current controller (42, 43) is made high, the battery 26 absorbs only short-time, momentary load fluctuation. When the response speed of the battery current controller (42, 43) is made low, the battery 26 absorbs the fluctuation having a time constant that is long to some extent. As above, a ratio at which the battery 26 absorbs the load fluctuation can be adjusted by adjusting the response speed of the battery current controller (42, 43). The response speed of the battery current controller (42, 43) can be adjusted by changing a control parameter of the PI controller 43.

Configuration Related to Target Current Value Control of Battery Current

Next, the configuration related to the control of the target current value IBt of the battery current IBm will be described. The inverter controller 32 adjusts the predetermined target current value IBt in accordance with a charge rate of the battery 26. The charge rate of the battery 26 is represented by a ratio of a present voltage value to a voltage value in a fully charged state. The inverter controller 32 calculates, as a charge rate RB, a ratio of a battery voltage value VBm to the voltage value in the fully charged state. Then, the predetermined target current value IBt is adjusted based on the charge rate RB as below.

In the present embodiment, a dead zone whose center corresponds to a target charge rate RBt is set for the charge rate RB.

When the charge rate RB becomes the predetermined target charge rate RBt, the predetermined target current value IBt is set to zero. The target charge rate RBt is suitably determined in accordance with, for example, the specifications of the power supply system. Herein, the target charge rate RBt is set to, for example, 0.5. This setting can easily deal with both a sudden decrease and a sudden increase in the DC power load (22, 24).

When the charge rate RB falls below a predetermined dead zone lower limit charge rate RBll, the predetermined target current value IBt is set to a negative value. The dead zone lower limit charge rate RBll is set to, for example, 0.4. In this case, the predetermined target current value IBt becomes a target current value of a charge current. With this, when the charge rate RB of the battery 26 decreases by discharging, the charge rate RB of the battery 26 can be made to return to the predetermined target charge rate RBt without the generation of hunting.

When the charge rate RB exceeds a predetermined dead zone upper limit charge rate RBul, the predetermined target current value IBt is set to a positive value. The dead zone upper limit charge rate RBul is set to, for example, 0.6. In this case, the predetermined target current value IBt becomes a target current value of a discharge current. With this, when the charge rate RB of the battery 26 increases by charging, the charge rate RB of the battery 26 can be made to return to the predetermined target charge rate RBt without the generating of hunting.

Configuration of Converter Controller 33

Figure 3:
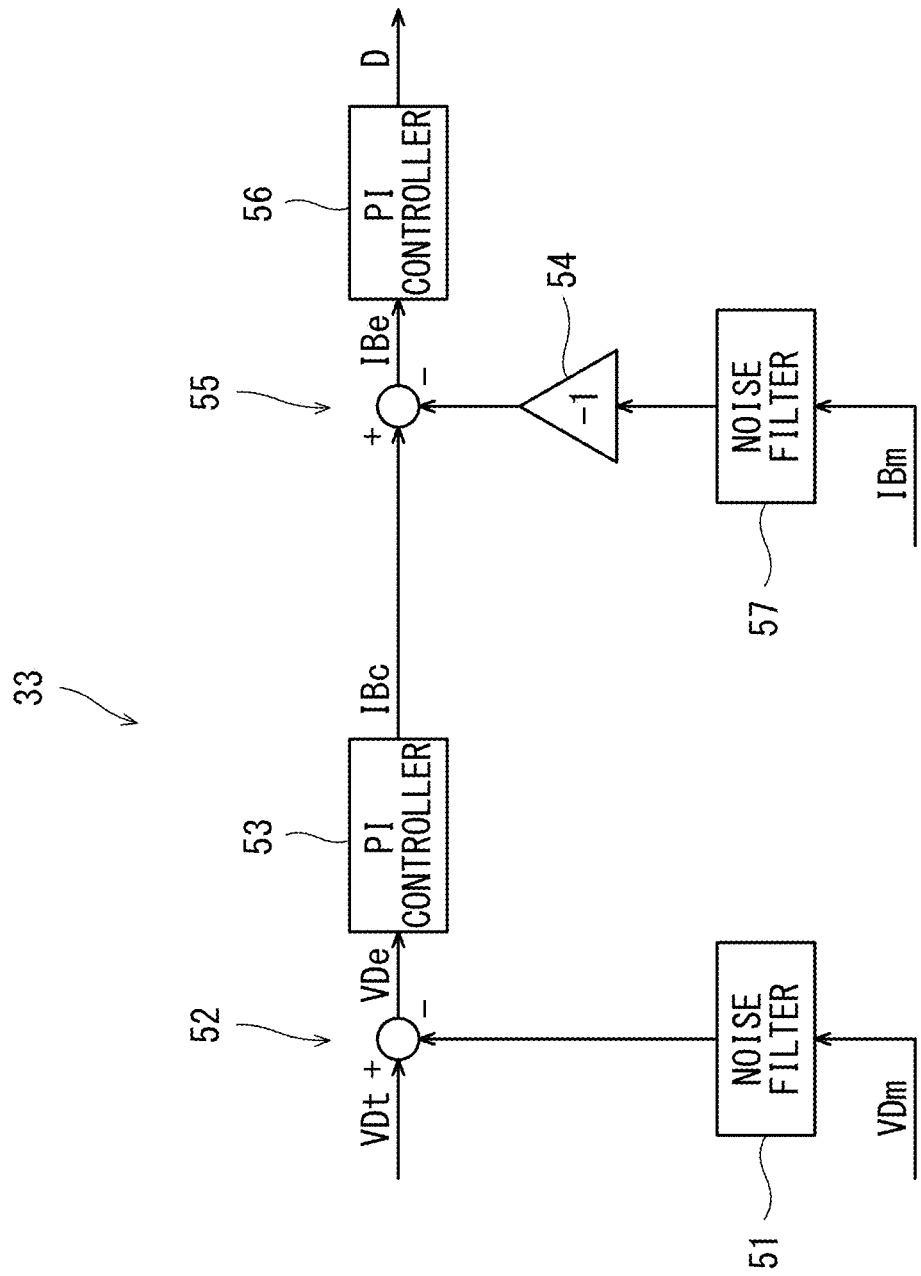
FIG. 3 is a block diagram showing the configuration of a converter controller of FIG. 1.

FIG. 3 is a block diagram showing the configuration of the converter controller 33 of FIG. 1. As shown in FIG. 3, the converter controller 33 includes a noise filter 51, a subtracter 52, a PI controller 53, an inverting element 54, a subtracter 55, a PI controller 56, and a noise filter 57.

The noise filter 51 eliminates noise of the DC power system voltage VDm.

The subtracter 52 subtracts the DC power system voltage VDm, from which the noise has been eliminated, from a DC power system target voltage value VDt of the DC power system 20 to generate a voltage deviation VDe. The DC power system target voltage value VDt is the reference voltage value of the DC power system 20.

The PI controller 53 subjects the voltage deviation VDe to the PI control to generate a battery current command value IBc.

The noise filter 57 eliminates noise of the battery current IBm. The inverting element 54 inverts the positive or negative sign of the battery current IBm from which the noise has been eliminated. This is because in the control of the converter 25, the battery current during charging is positive.

The subtracter 55 subtracts the battery current IBm, whose positive or negative sign has been inverted, from the battery current command value Mc to generate a current deviation IBce.

The PI controller 5 subjects the current deviation IBce to the PI control to generate a duty command value D and outputs the duty command value D to the converter 25.

The converter 25 operates the DC chopper based on the duty command value D to increase or decrease the voltage of the battery 26. By this control, the battery 26 is discharged when the DC power system voltage VDm falls below the DC power system target voltage value VDt, and the battery 26 is charged when the DC power system voltage VDm exceeds the DC power system target voltage value VDt. With this, the DC power system voltage VDm is maintained at the DC power system target voltage value VDt.

Operation

Next, the operation of the electric power control system 100 configured as above will be described, i.e., the operation of the power supply system 200 will be described.

As shown in FIGS. 1 to 3, when sudden load fluctuation occurs at the DC power load (22 to 24), the DC power system voltage VDm fluctuates. In this case, the converter controller 33 controls the converter 25 to discharge or charge the battery 26 such that: the fluctuation of the DC power system voltage VDm is canceled; and the DC power system voltage VDm is maintained at the predetermined DC power system target voltage value VDt. With this, electric power corresponding to the load fluctuation is supplied to or discharged from the DC power load (22 to 24). As a result, the fluctuation of the voltage of the DC power system 20 is suppressed.

On the other hand, in this period of time, the inverter controller 32 controls the power supply inverter 31 to mutually convert the DC power of the DC power system 20 and the AC power of the AC power system 10 such that the battery current IBm coincides with the predetermined target current value IBt. Therefore, the discharging or charging of the battery 26 due to the sudden load fluctuation of the DC power load (22 to 24) converges after the discharging or charging by which the battery current IBm coincides with the predetermined target current value IBt that is stationary converges. As a result, the DC power of the DC power system 20 and the AC power of the AC power system 10 converge after the discharging or charging by which the battery current IBm coincides with the predetermined target current value IBt that is stationary converges. With this, the influence of the sudden load fluctuation of the DC power load (22 to 24) on the AC power system 10 is suppressed.

Moreover, when the charge rate RB of the battery 26 changes due to the sudden load fluctuation of the DC power load (22 to 24), the inverter controller 32 adjusts the predetermined target current value IBt in accordance with the charge rate of the battery 26. As a result, the charge rate RB of the battery 26 returns to the predetermined target charge rate RBt.

Simulation

Figure 4:
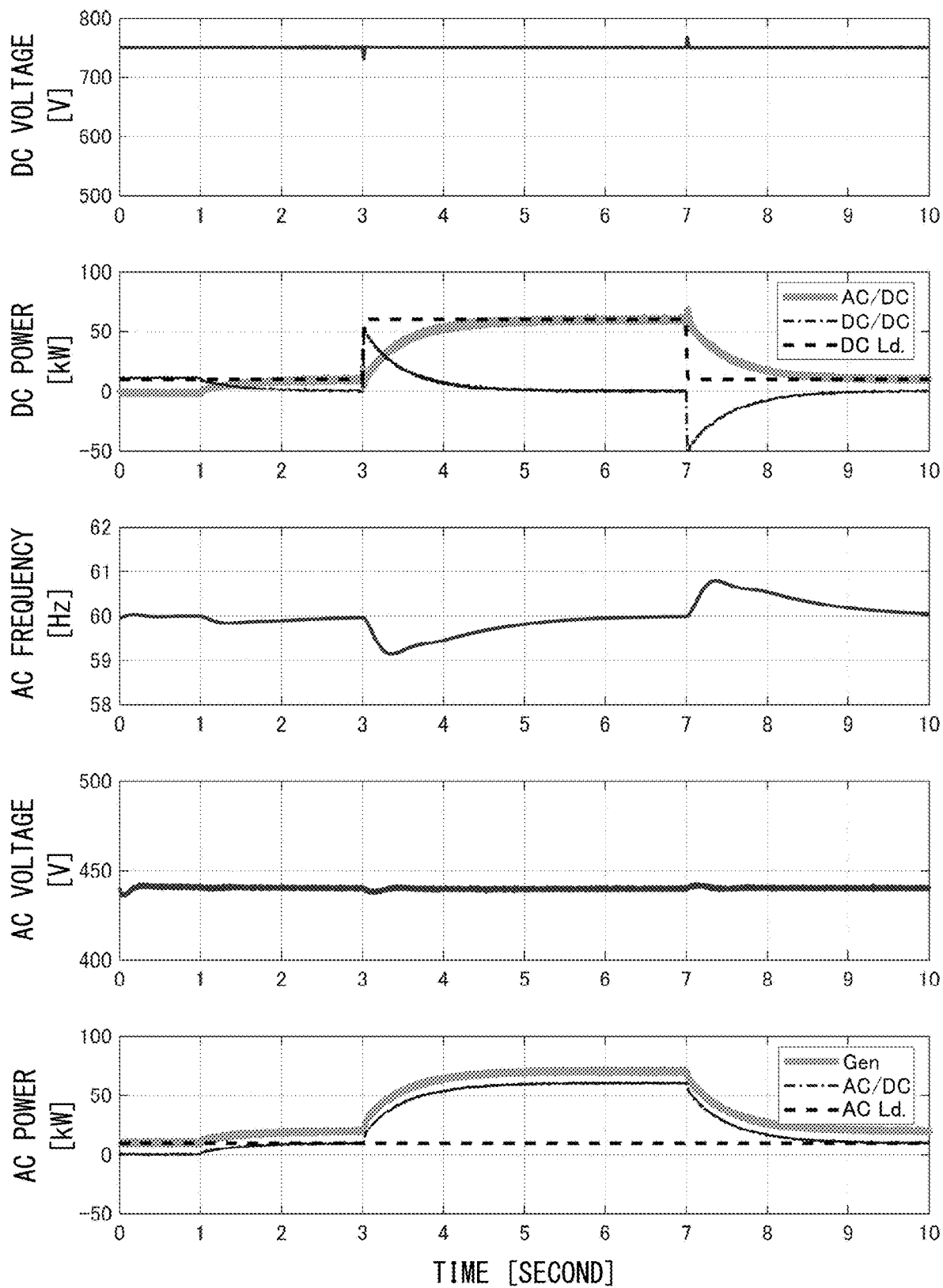
FIG. 4 is a graph showing the result of a simulation of the power supply system of FIG. 1.
Figure 5:
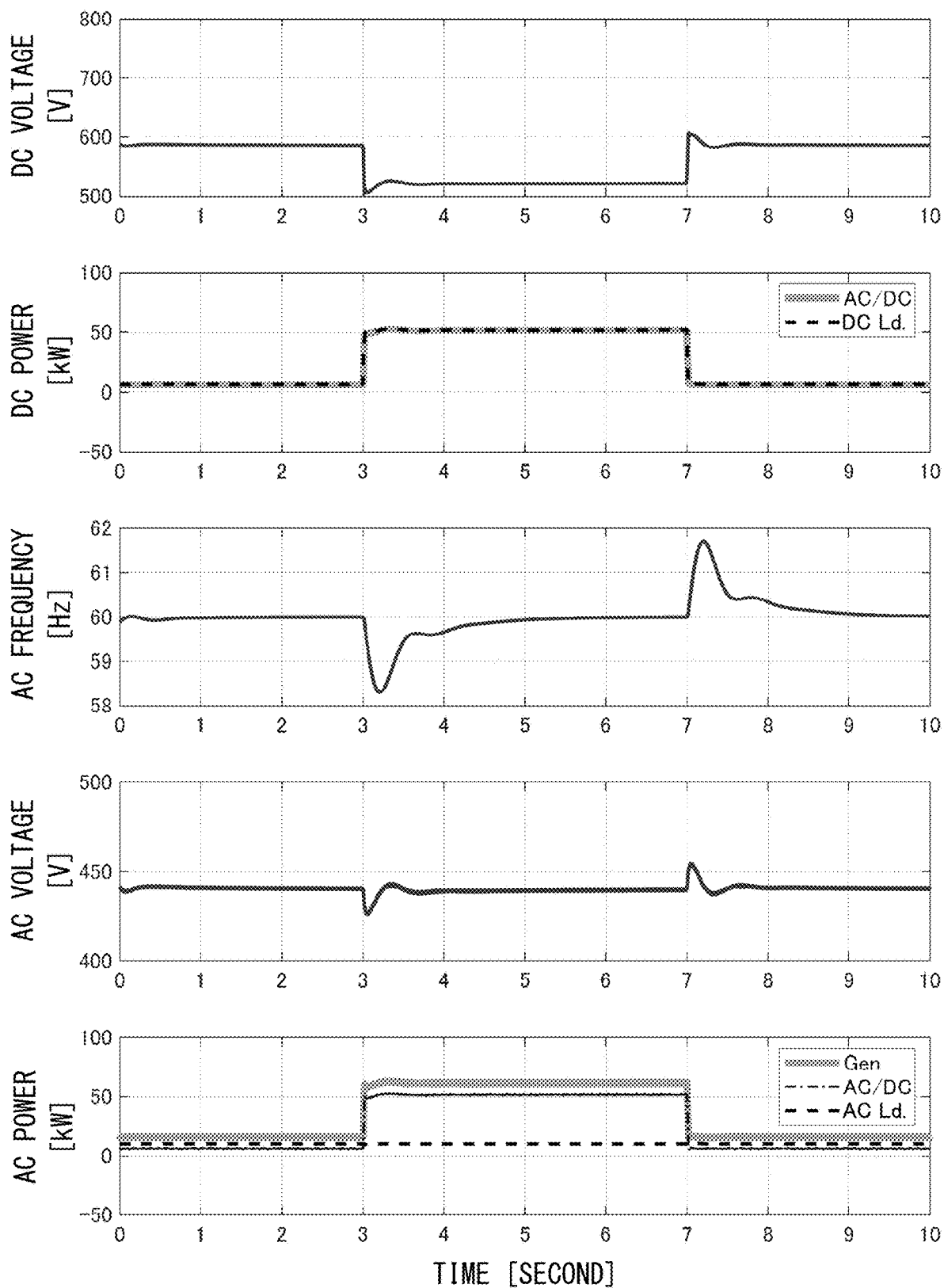
FIG. 5 is a graph showing the result of a simulation of the power supply system of Comparative Example.

FIG. 4 is a graph showing the result of a simulation of the power supply system 200 of FIG. 1. FIG. 5 is a graph showing the result of a simulation of the power supply system of Comparative Example. Comparative Example is different from the power supply system 200 of Embodiment 1 in that in FIG. 1, the DC power system 20 does not include the electric power storage (25, 26), and the power supply inverter 31 is replaced with a diode rectifier. Except for these, Comparative Example is the same in configuration as the power supply system 200 of Embodiment. In the power supply system 200 of Embodiment 1, the predetermined target current value IBt in the inverter controller 32 is set to zero.

In this simulation, the DC power load (22 to 24) is increased and then decreased in a step manner in a time zone in which an elapsed time since the start of the simulation is between three seconds and seven seconds.

In FIG. 4, horizontal axes of five graphs denote an elapsed time (seconds). A vertical axis of the uppermost graph denotes a DC voltage (DC power system voltage VDm) (V) of the DC power system 20. A vertical axis of the second graph from the top denotes DC power (kW) in the DC power system 20. A vertical axis of the third graph from the top denotes a frequency (Hz) of the AC power system 10. A vertical axis of the fourth graph from the top denotes a voltage (V) of the AC power system 10. A vertical axis of the lowermost graph denotes electric power (kW) of the AC power system 10. Moreover, in the second graph from the top, a gray line labeled as "AC/DC" denotes DC power of the power supply inverter 31, a one-dot chain line labeled as "DC/DC" denotes DC power of the converter 25, and a broken line labeled as "DC Ld." denotes DC power of the DC power load (22 to 24). Furthermore, in the lowermost graph, a gray line labeled as "Gen" denotes AC power of the power generator 12, a one-dot chain line labeled as "AC/DC" denotes AC power of the power supply inverter 31, and a broken line labeled as "AC Ld." denotes AC power of the AC load (14).

Five graphs in FIG. 5 are the same as the graphs in FIG. 4 except for the second graph from the top. A vertical axis of the second graph from the top denotes DC power (kW) in the DC power system 20 and the AC power system 10. A gray line labeled as "AC/DC" denotes DC power of the diode rectifier, and a broken line labeled as "DC Ld." denotes DC power of the DC power load (22 to 24).

First, as shown in FIG. 5, in Comparative Example, due to the increase and decrease in the DC power load (22 to 24) in the step manner, the DC voltage suddenly decreases by about 50 V. In addition, the fluctuation of the electric power is transmitted through the diode rectifier to the AC power system 10 as it is, and the load (AC power) of the power generator 12 driven by the engine suddenly fluctuates.

On the other hand, as shown in FIG. 4, in the power supply system 200 of Embodiment 1, when the DC power load (22 to 24) suddenly fluctuates, the load fluctuation is absorbed by constant control of the DC voltage (DC power system voltage VDm) by the converter 25. Then, the battery current IBm is controlled by the power supply inverter 31 to become zero, and therefore, the current (DC power) of the converter 25 converges to zero in about one to two seconds, and the load fluctuation (the AC power of the power supply inverter 31) transmitted to the AC power system 10 gently rises. With this, the DC voltage of the DC power system 20 is significantly suppressed, and the load fluctuation of the power generator 12 driven by the engine and the fluctuation of the AC voltage and frequency of the AC power system 10 become gentle.

In this simulation, in the control of the battery current IBm by the power supply inverter 31, the control parameter is set such that the battery current IBm converges to zero with a time constant of about 0.6 second. However, the time constant can be adjusted by changing the control parameter. Therefore, the adjustment (selection) of the time constant together with the selection of the necessary capacity of the battery 26 can contribute to the optimal design of the power supply system 200.

Embodiment 2

As an example, Embodiment 2 of the present application describes a case where second control of suppressing the influence of the load fluctuation on the AC power system 10 is superimposed on the first control of the power supply system 200 of Embodiment 1.

As shown in FIGS. 1 and 2, the first control in the power supply system 200 of Embodiment 1 is to control the output or input of the AC terminal of the bidirectional electric power converter (31) such that the charge current, discharge current, charge electric power, or discharge electric power of the electric power storage (25, 26) coincides with a predetermined target current value IBt (see FIG. 2) or a predetermined target electric power value. In Embodiment 2, the bidirectional electric power conversion controller (31) performs the second control of controlling the output or input of the AC terminal of the bidirectional electric power converter (31) so as to suppress the fluctuation of at least one of the electric power, voltage, current, or frequency of the AC power system 10 such that the second control is superimposed on the first control. Herein, the above expression "the second control is superimposed on the first control" denotes that "the output or input of the AC terminal of the bidirectional electric power converter is controlled such that: the charge current, discharge current, charge electric power, or discharge electric power of the electric power storage (25, 26) coincides with the predetermined target current value IBt or the predetermined target electric power value; and the fluctuation of at least one of the electric power, voltage, current, or frequency of the AC power system 10 is suppressed." Moreover, the cause of "the fluctuation of at least one of the electric power, voltage, current, or frequency of the AC power system 10" is not especially limited, and examples of the cause include the load fluctuation of the AC power load (14) of the AC power system 10 and the load fluctuation of the DC power load (22 to 24) of the DC power system 20.

An object of the second control is to, when at least one of the electric power, voltage, current, or frequency of the AC power system 10 fluctuates due to the load fluctuation, suppress the fluctuation of at least one of the electric power, voltage, current, or frequency of the AC power system 10 in such a manner that the electric power (or the current) is supplied to or discharged from the AC power system 10 by the bidirectional electric power converter (31).

As an example, the following will describe a case where the second control controls the output or input of the AC side of the bidirectional electric power converter (31) so as to suppress the fluctuation of the frequency of the AC power system 10 by feedback of active electric power output from or input to the AC side of the bidirectional electric power converter (31). Moreover, as an example, each of Embodiments 5 and 6 describes a case where the second control controls the output or input of the AC side of the bidirectional electric power converter (31) so as to suppress the fluctuation of the voltage of the AC power system 10 by feedback of the reactive electric power or active electric power output from or input to the AC side of the bidirectional electric power converter (31). Cases of the second control other than the above cases can be performed in the same manner as Embodiments 2, 5, and 6 with reference to Embodiments 2, 5, and 6.

Moreover, when performing intended control instead of stabilizing the AC power system 10, in addition to the suppression of the fluctuation, the second control of controlling the output or input of the AC terminal of the bidirectional electric power converter (31) may be performed based on at least one of the electric power, voltage, current, or frequency of the AC power system 10 so as to be superimposed on the first control.

Hereinafter, Embodiment 2 will be specifically described.

Specific Configuration and Operation

Figure 6:
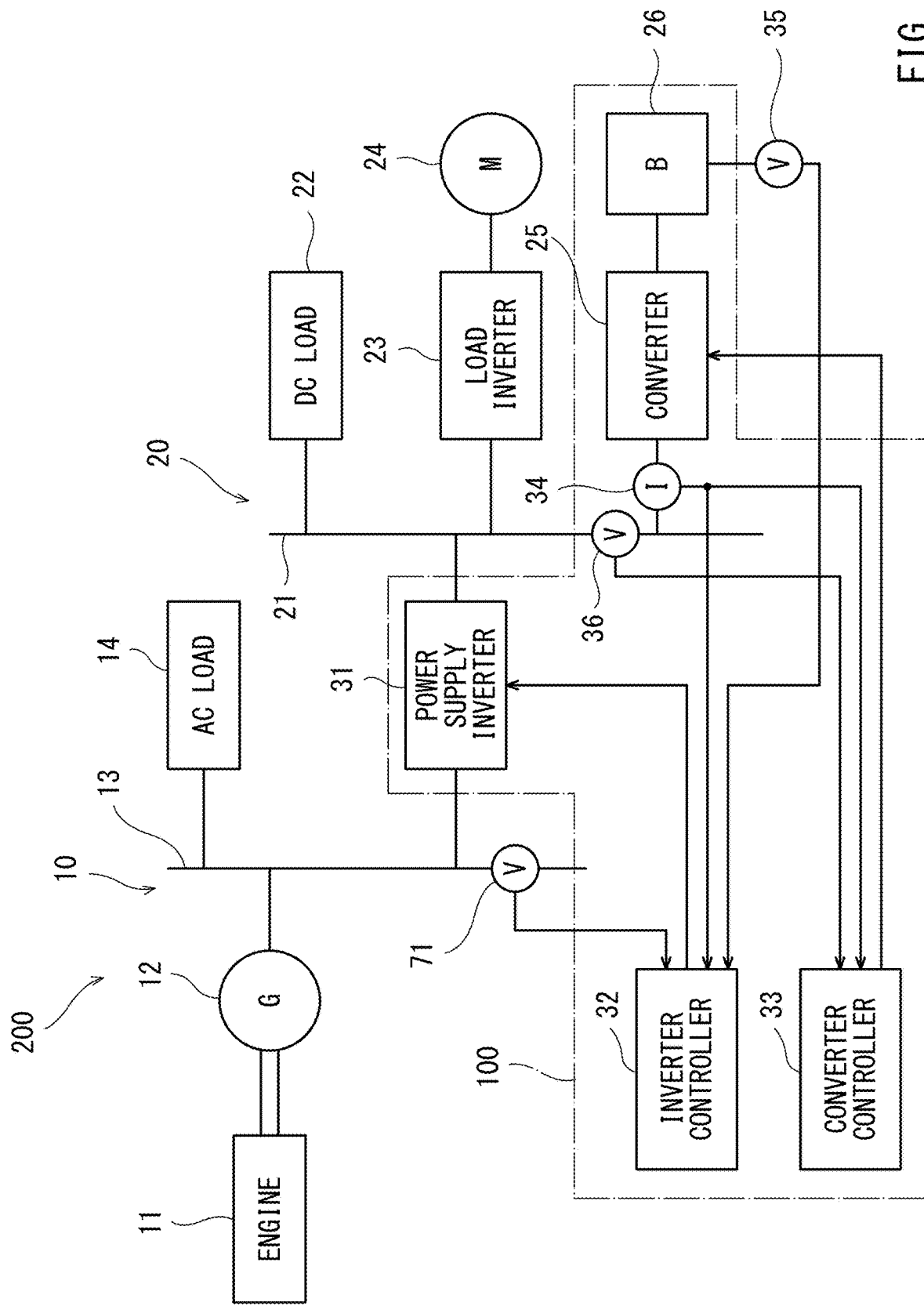
FIG. 6 is a block diagram showing the configuration of the power supply system according to Embodiment 2 of the present application.

FIG. 6 is a block diagram showing the configuration of the power supply system according to Embodiment 2 of the present application.

As shown in FIG. 6, the power supply system 200 of Embodiment 2 further includes an AC power system voltmeter 71. The AC power system voltmeter 71 measures the voltage of the bus line 13 of the AC power system 10. Hereinafter, this measured voltage is called an AC power system voltage.

Figure 7:
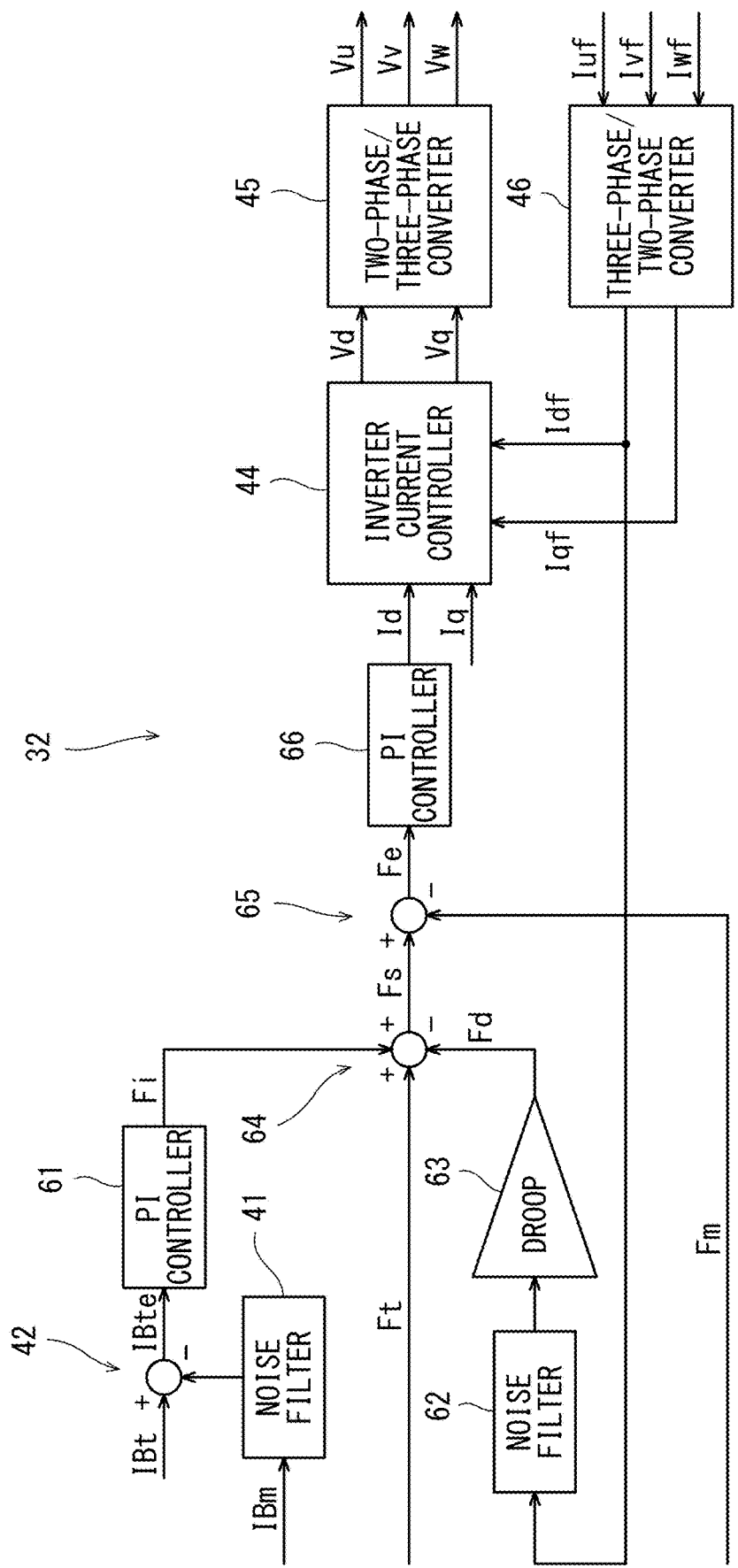
FIG. 7 is a block diagram showing the configuration of the inverter controller of FIG. 6.

FIG. 7 is a block diagram showing the configuration of the inverter controller 32 of FIG. 6. As shown in FIG. 7, the inverter controller 32 includes the noise filter 41, the subtracter 42, a PI controller 61, a noise filter 62, a drooping unit 63, an adder-subtracter 64, a subtracter 65, a PI controller 66, the inverter current controller 44, the two-phase/three-phase converter 45, and the three-phase/two-phase converter 46.

The noise filter 41 and the subtracter 42 are the same as the noise filter 41 and the subtracter 42 in Embodiment 1, respectively. Moreover, the inverter current controller 44, the two-phase/three-phase converter 45, and the three-phase/two-phase converter 46 are the same as the inverter current controller 44, the two-phase/three-phase converter 45, and the three-phase/two-phase converter 46 in Embodiment 1, respectively.

The PI controller 61 subjects the current deviation IBte, generated by the subtracter 42, to the PI control to generate a target frequency value Fi corresponding to the battery current IBm.

On the other hand, the noise filter 62 eliminates noise of the d-axis current Idf converted by the three-phase/two-phase converter 46. The drooping unit 63 converts the d-axis current Idf, from which the noise has been eliminated, into a target frequency value Fd corresponding to the d-axis current in accordance with a drooping characteristic.

The adder-subtracter 64 generates a total target frequency value Fs by: adding the target frequency value Fi corresponding to the battery current IBm to a predetermined target frequency value Ft that is a reference frequency of the AC power system 10; and subtracting the target frequency value Fd corresponding to the d-axis current from the predetermined target frequency value Ft.

On the other hand, the inverter controller 32 generates an AC power frequency Fm based on the AC power system voltage measured by the AC power system voltmeter 71.

The subtracter 65 generates a frequency deviation Fe by subtracting an AC power system frequency Fm from the total target frequency value Fs.

The PI controller 66 generates the d-axis current command value Id by subjecting the frequency deviation Fe to the PI control. Since subsequent processing is the same as that of the inverter controller 32 of Embodiment 1, the explanation thereof is omitted.

According to this control, in a process in which the DC power of the DC power system 20 and the AC power of the AC power system 10 are mutually converted such that the battery current IBm coincides with the predetermined target current value IBt, the d-axis current that suppresses the fluctuation of the frequency Fm of the AC power system 10 in accordance with the fluctuation of the frequency Fm is output from or input to the AC side of the power supply inverter 31. This is because when the frequency Fm of the AC power system 10 fluctuates to deviate from the target frequency value Ft, the d-axis current that cancels this fluctuation is output from or input to the AC side of the power supply inverter 31. The d-axis current represents the active electric power.

As a result, the fluctuation of the frequency Fm of the AC power system 10 is suppressed. In this control, the frequency Fm of the AC power system 10 does not converge to the target frequency value Ft. This is because the target frequency value Fd corresponding to the d-axis current Id changes by the output of the power supply inverter 31 itself, and therefore, the total target frequency value Fs changes. However, this is not a problem. This is because an object of this control is simply to, when the frequency Fm fluctuates due to the load fluctuation, suppress the fluctuation of the frequency Fm in such a manner that the electric power (or the current) is supplied to or discharged from the AC power system 10 by the power supply inverter 31.

When the d-axis current Idf is a positive value, the DC power of the DC power system 20 is converted into the AC power of the AC power system 10. When the d-axis current Idf is a negative value, the AC power of the AC power system 10 is converted into the DC power of the DC power system 20.

Herein, the following points are important.

In Embodiment 2, the response of the second control is set faster than the response of the first control. The response speed of the first control is set by the control parameter of the PI controller 61, and the response speed of the second control is set by the control parameter of the PI controller 66.

For example, when the load of the AC load 14 fluctuates, and the power supply inverter 31 absorbs this fluctuation, this load fluctuation is absorbed by the electric power storage (25, 26) through the power supply inverter 31. However, if the electric power storage (25, 26) tries to absorb this load fluctuation after a charge or discharge current IBm of the electric power storage (25, 26) converges by the first control so as to coincide with the predetermined target current value IBt, the charge or discharge current IBm is maintained at the predetermined target current value IBt, and therefore, the first control cancels the second control, and the electric power storage (25, 26) cannot absorb this load fluctuation. However, according to this configuration, since the response of the second control is faster than the response of the first control, the first control does not cancel the second control, and the electric power storage (25, 26) can absorb the load fluctuation of the AC load 14. However, that the response of the second control is faster than the response of the first control is not essential in Embodiment 2. This is because when the second control is superimposed on the first control, the load fluctuation is absorbed by the electric power storage (25, 26) through the power supply inverter 31 by the second control until the charge or discharge current IBm of the electric power storage (25, 26) converges by the first control so as to coincide with the predetermined target current value IBt.

As described above, according to Embodiment 2, the load fluctuation is shared with the power generator 12, and the load fluctuation of the power generator 12 driven by the engine and the fluctuation of the frequency Fm of the AC power system 10 can be suppressed.

Simulation

Figure 8:
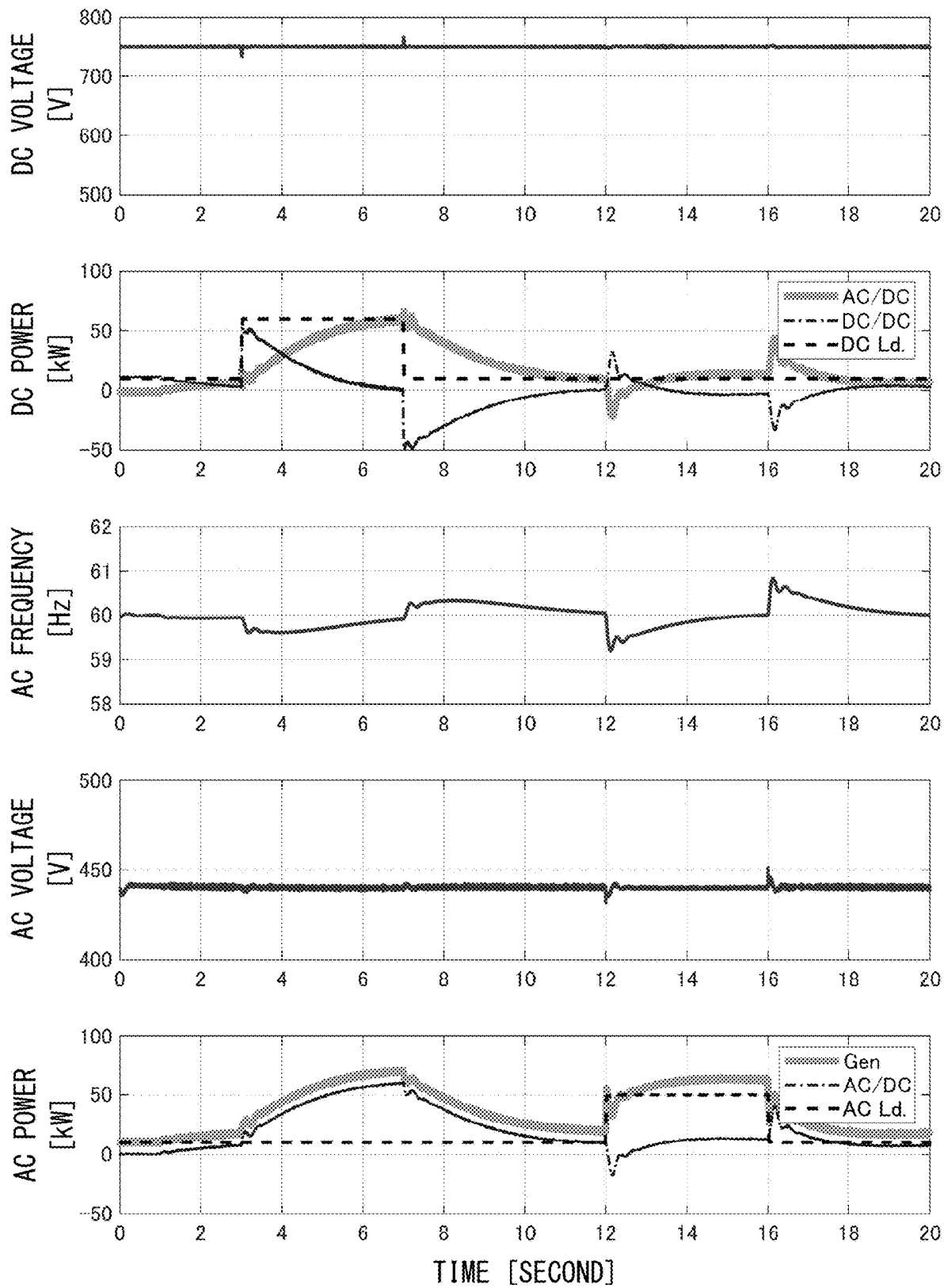
FIG. 8 is a graph showing the result of a simulation of the power supply system of FIG. 6.

FIG. 8 is a graph showing the result of a simulation of the power supply system 200 of FIG. 6. Comparative Example of Embodiment 2 is the same as Comparative Example of Embodiment 1. How to draw the graphs in FIG. 8 is the same as how to draw the graphs in FIG. 4. How to draw the graphs in FIG. 9 is the same as how to draw the graphs in FIG. 5.

In the power supply system 200 of Embodiment 2, the predetermined target current value IBt in the inverter controller 32 is set to zero. Moreover, a control gain is set such that a convergence time constant of the battery current IBm of the converter 25 becomes about 1.5 seconds.

In this simulation, the DC power load (22 to 24) is applied after three seconds from the start of the simulation, and the DC power load (22 to 24) is cut after seven seconds from the start of the simulation. Then, the AC load (14) is applied after 12 seconds from the start of the simulation, and the AC load (14) is cut after 16 seconds from the start of the simulation.

Figure 9:
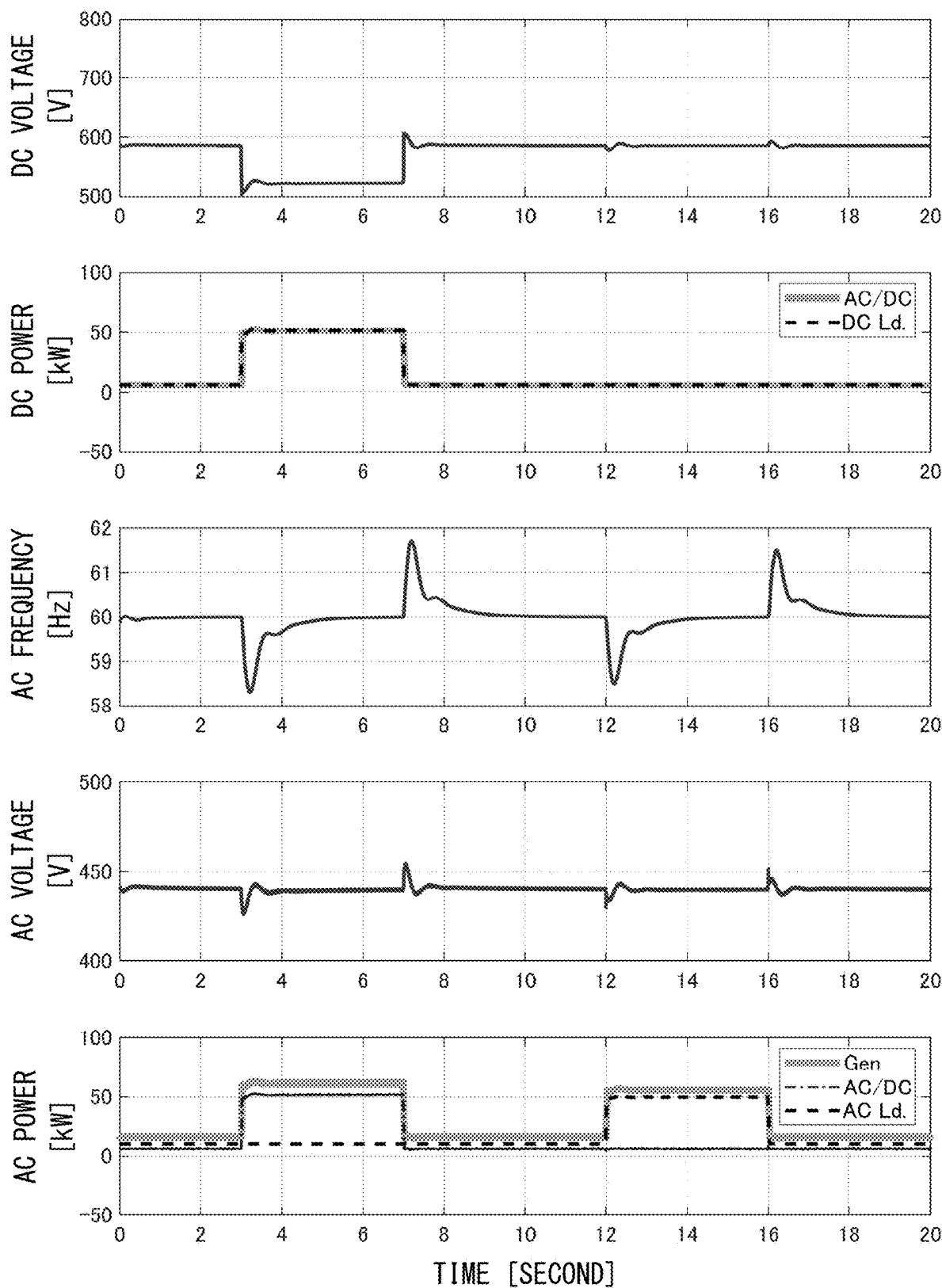
FIG. 9 is a graph showing the result of a simulation of the power supply system of Comparative Example.

First, as shown in FIG. 9, in Comparative Example, the fluctuation when the DC power load (22 to 24) is applied is similar to that of FIG. 5. As with when the DC power load (22 to 24) is applied, when the AC load (14) is applied, the frequency and voltage of the AC power system fluctuate, and the load (AC power) of the power generator 12 driven by the engine suddenly fluctuates.

On the other hand, as shown in FIG. 8, the behavior when the DC power load (22 to 24) is applied is substantially similar to that of FIG. 4 although a convergence time is different since the control gain is set such that the convergence time constant of the battery current IBm of the converter 25 becomes about 1.5 seconds. On the other hand, when the AC load (14) is applied, the steep load fluctuation is absorbed by the power supply inverter 31 having been subjected to the drooping control, and with this, the fluctuation of the load (AC power) of the power generator 12 is suppressed, and the fluctuation of the frequency and voltage of the AC power system 10 is significantly suppressed. The entire load fluctuation absorbed by the power supply inverter 31 by the drooping control is absorbed by the converter 25 through the DC power system 20. Therefore, after the load fluctuation is absorbed, the battery current IBm of the converter 25 converges to zero with a time constant of about 1.5 seconds again, and the power generator 12 absorbs all the stationary loads.

Embodiment 3

According to Embodiment 3 of the present application, a dead zone is set for the battery current IBm of the battery current controller of Embodiment 2.

Figure 10:
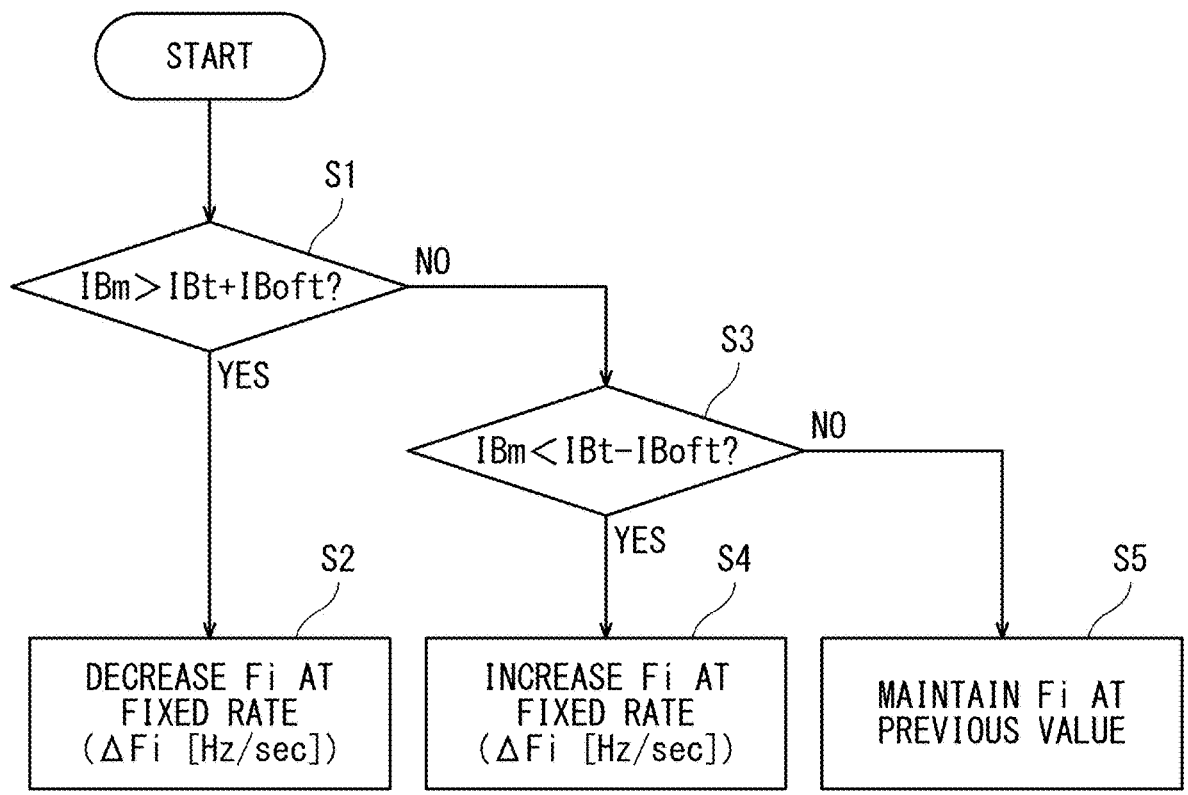
FIG. 10 is a flow chart showing a dead zone operation of a battery current controller in the inverter controller of the power supply system according to Embodiment 3 of the present application.

As shown in FIG. 7, the subtracter 42 and the PI controller 61 constitute the battery current controller. FIG. 10 is a flow chart showing a dead zone operation of the battery current controller (42, 61) of the inverter controller of the power supply system according to Embodiment 3 of the present application.

As shown in FIG. 10, in a case where the battery current IBm exceeds the predetermined target current value IBt of the battery current IBm by a fixed value IBoft (Yes in Step 51), the battery current controller (42, 61) decreases the target frequency value Fi corresponding to the battery current IBm at a fixed rate ($\Delta$Fi [Hz/sec]) (Step S2). In a case where the battery current IBm falls below the predetermined target current value IBt of the battery current IBm by the fixed value IBoft (Yes in Step S3), the battery current controller (42, 61) increases the target frequency value Fi corresponding to the battery current IBm at the fixed rate ($\Delta$Fi [Hz/sec]) (Step S4). In a case other than the above cases (No in Step S3), the battery current controller (42, 61) maintains the target frequency value Fi corresponding to the battery current IBm at a previous value (Step S5).

With this, the operation of generating the target frequency value Fi corresponding to the battery current IBm is stabilized (hunting is prevented).

Figure 11:
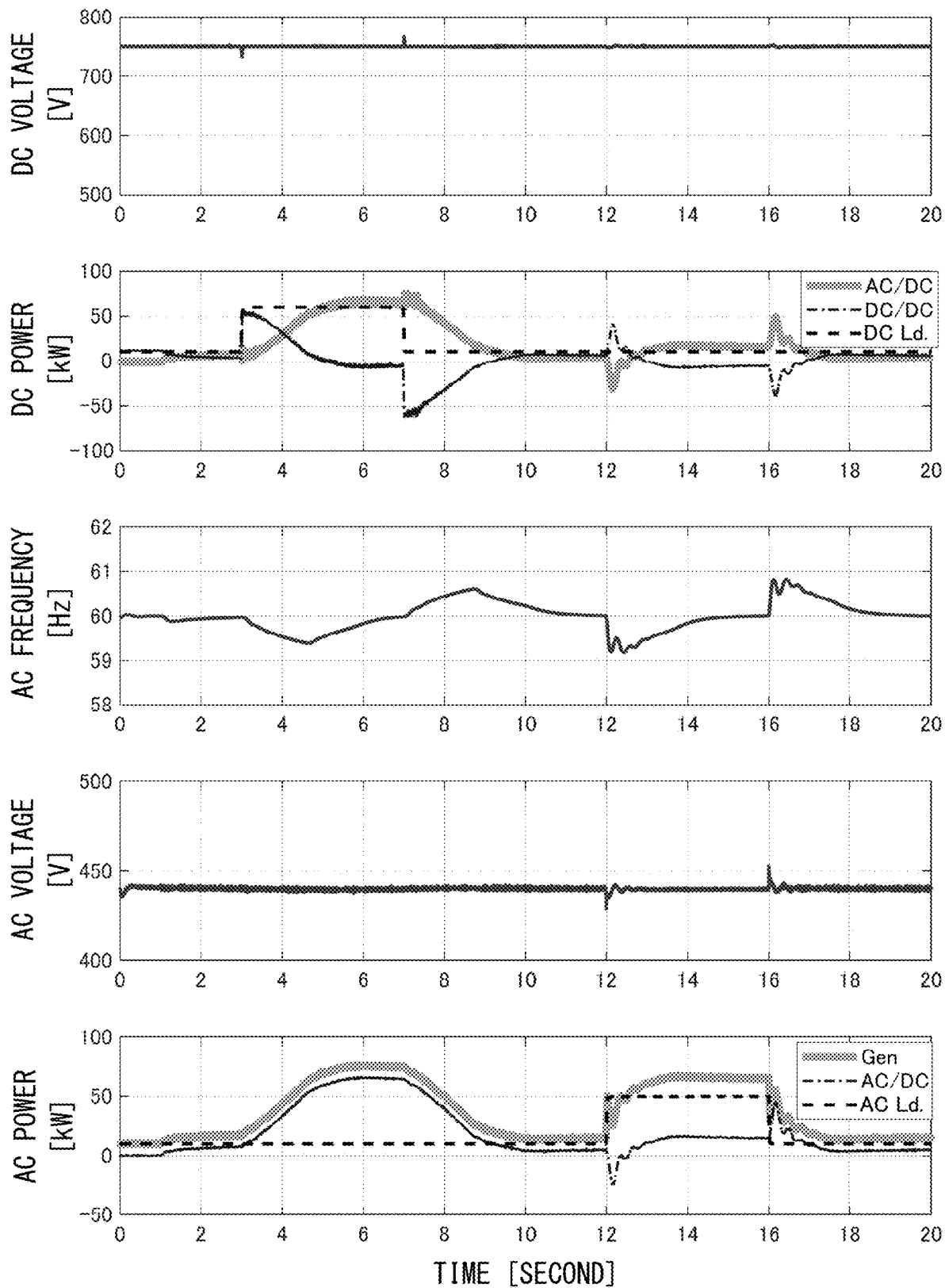
FIG. 11 is a graph showing the result of a simulation of the power supply system of Embodiment 3.

FIG. 11 is a graph showing the result of a simulation of the power supply system 200 of Embodiment 3. How to draw the graphs of FIG. 11 is the same as that of FIG. 8. Conditions of the simulation of Embodiment 3 are the same as the conditions of the simulation of Embodiment 2.

As shown in FIG. 11, results similar to those of the simulation of Embodiment 2 are obtained.

Embodiment 4

As an example, Embodiment 4 of the present application describes a case where in the electric power control system 100 (power supply system 200) of Embodiment 2, the second control further includes control of controlling the output or input of the AC side of the bidirectional electric power converter (31) so as to suppress the fluctuation of the voltage of the AC power system 10 by feedback of the reactive electric power output from or input to the AC side of the bidirectional electric power converter (31).

Figure 12:
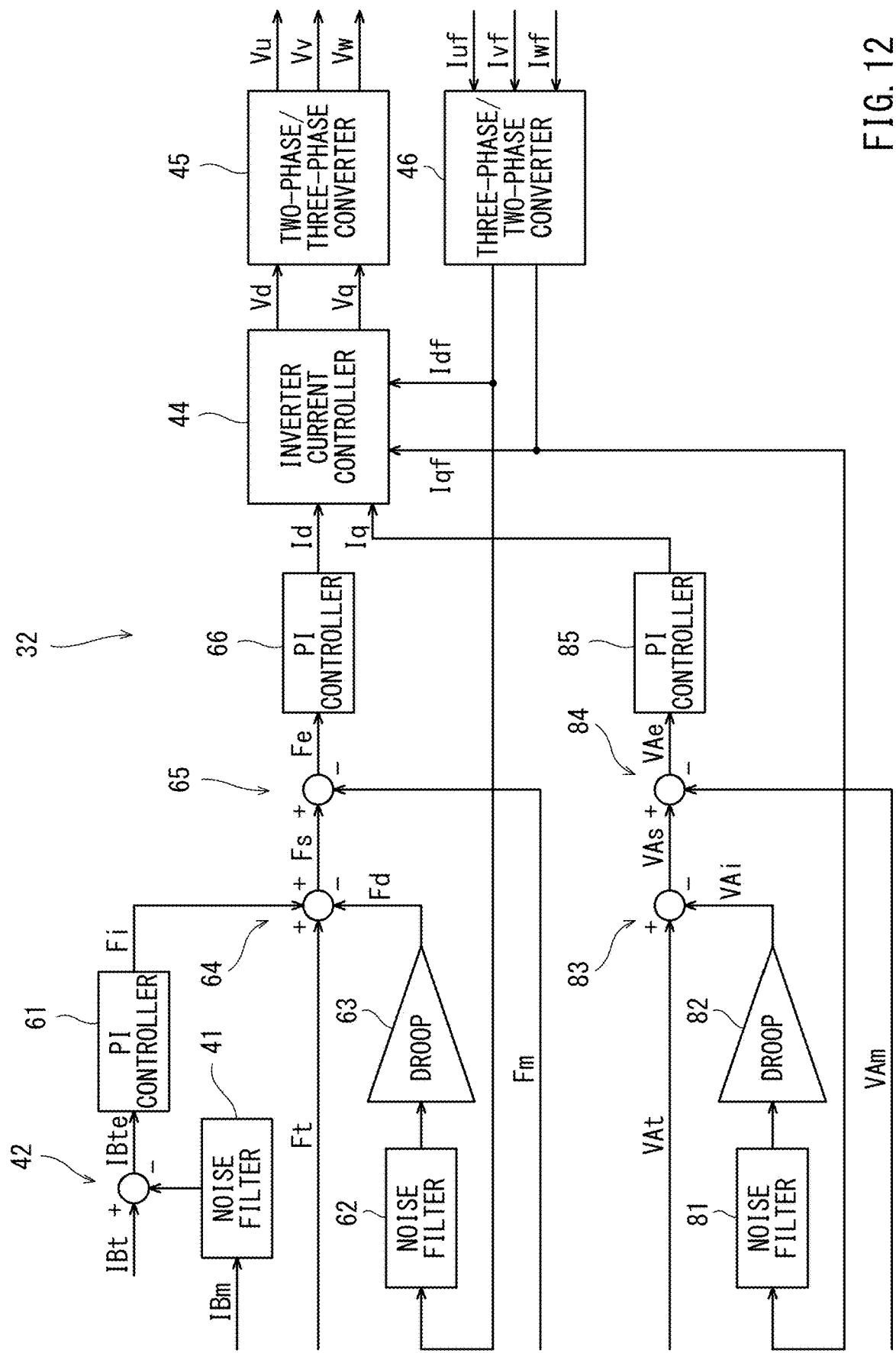
FIG. 12 is a block diagram showing the configuration of the inverter controller of the power supply system according to Embodiment 4 of the present application.

FIG. 12 is a block diagram showing the configuration of the inverter controller 32 of the power supply system 200 according to Embodiment 4 of the present application.

As shown in FIG. 12, the inverter controller 32 of Embodiment 4 corresponds to the inverter controller 32 of Embodiment 2 and further includes a noise filter 81, a drooping unit 82, a subtracter 83, a subtracter 84, and a PI controller 85.

The noise filter 81 eliminates the noise of the q-axis current Iqf converted by the three-phase/two-phase converter 46. The drooping unit 82 converts the q-axis current Iqf, from which the noise has been eliminated, into a target AC voltage value VAi corresponding to the q-axis current in accordance with the drooping characteristic.

The subtracter 83 generates a total target AC voltage value VAs by subtracting the target AC voltage value VAi corresponding to the q-axis current from a predetermined target AC voltage value VAt that is a reference voltage of the AC power system 10.

The subtracter 84 generates a voltage deviation VAe by subtracting an AC power system voltage VAm, measured by the AC power system voltmeter 71, from the total target AC voltage value VAs.

The PI controller 85 generates the q-axis current command value Iq by subjecting the voltage deviation VAe to the PI control. Since subsequent processing is the same as that of the inverter controller 32 of Embodiment 1, the explanation thereof is omitted.

As a result of the second control, in addition to the effects of Embodiment 2, in a process in which the DC power of the DC power system 20 and the AC power of the AC power system 10 are mutually converted such that the battery current IBm coincides with the predetermined target current value IBt, the q-axis current that suppresses the fluctuation of the voltage VAm of the AC power system 10 in accordance with the fluctuation of the voltage VAm is output from or input to the AC side of the power supply inverter 31. This is because when the voltage VAm of the AC power system 10 fluctuates to deviate from the target AC voltage value VAt, the q-axis current that cancels this fluctuation is output from or input to the AC side of the power supply inverter 31. The q-axis current represents the reactive electric power.

As a result, the fluctuation of the voltage VAm of the AC power system 10 is suppressed.

As described above, according to Embodiment 4, the load fluctuation is shared with the power generator 12, and the load fluctuation of the power generator 12 driven by the engine and the fluctuation of the frequency Fm and voltage of the AC power system 10 can be suppressed.

Embodiment 5

As an example, Embodiment 5 of the present application describes a case where in the electric power control system 100 (power supply system 200) of Embodiment 1, the second control controls the output or input of the AC side of the bidirectional electric power converter (31) so as to suppress the fluctuation of the voltage of the AC power system 10 by feedback of the reactive electric power output from or input to the AC side of the bidirectional electric power converter (31).

Figure 13:
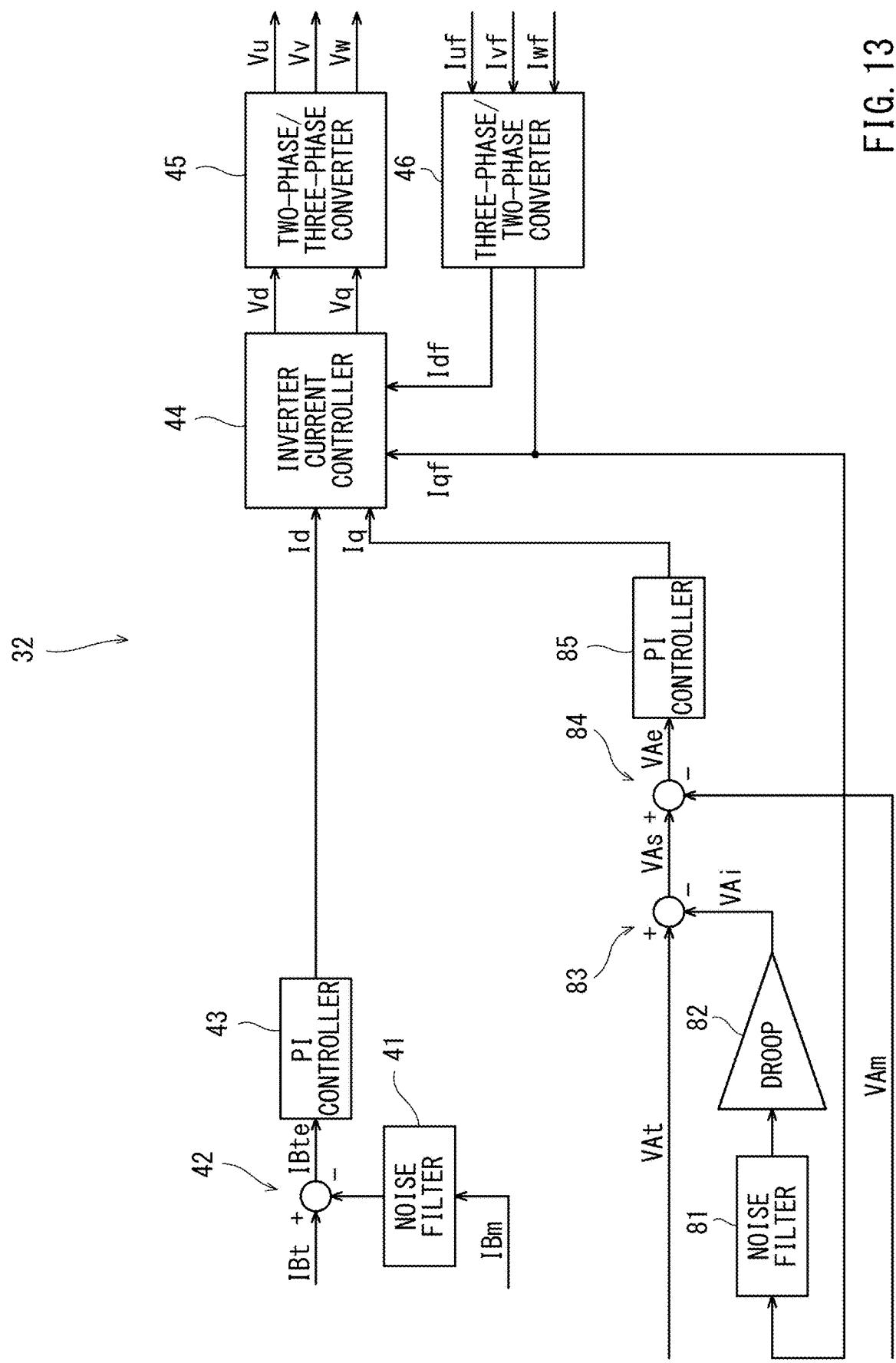
FIG. 13 is a block diagram showing the configuration of the inverter controller of the power supply system according to Embodiment 5 of the present application.

FIG. 13 is a block diagram showing the configuration of the inverter controller 32 of the power supply system according to Embodiment 5 of the present application.

As shown in FIG. 13, the inverter controller 32 of Embodiment 5 corresponds to the inverter controller 32 of Embodiment 1 and further includes the noise filter 81, the drooping unit 82, the subtracter 83, the subtracter 84, and the PI controller 85.

Since the configurations of these additional components are the same as the configurations of the additional components added to Embodiment 2 in Embodiment 4, the explanations thereof are omitted.

According to the second control in Embodiment 5, in a process in which the DC power of the DC power system 20 and the AC power of the AC power system 10 are mutually converted such that the battery current IBm coincides with the predetermined target current value IBt, the q-axis current that suppresses the fluctuation of the voltage VAm of the AC power system 10 in accordance with the fluctuation of the voltage VAm is output from or input to the AC side of the power supply inverter 31. As a result, the fluctuation of the voltage VAm of the AC power system 10 is suppressed.

Therefore, according to Embodiment 5, in addition to the effects of Embodiment 1, the fluctuation of the voltage VAm of the AC power system 10 can be suppressed.

Embodiment 6

As an example, Embodiment 6 of the present application describes a case where in the electric power control system 100 (power supply system 200) of Embodiment 1, the second control controls the output or input of the AC side of the bidirectional electric power converter (31) so as to suppress the fluctuation of the voltage of the AC power system 10 by feedback of the active electric power output from or input to the AC side of the bidirectional electric power converter (31).

Figure 14:
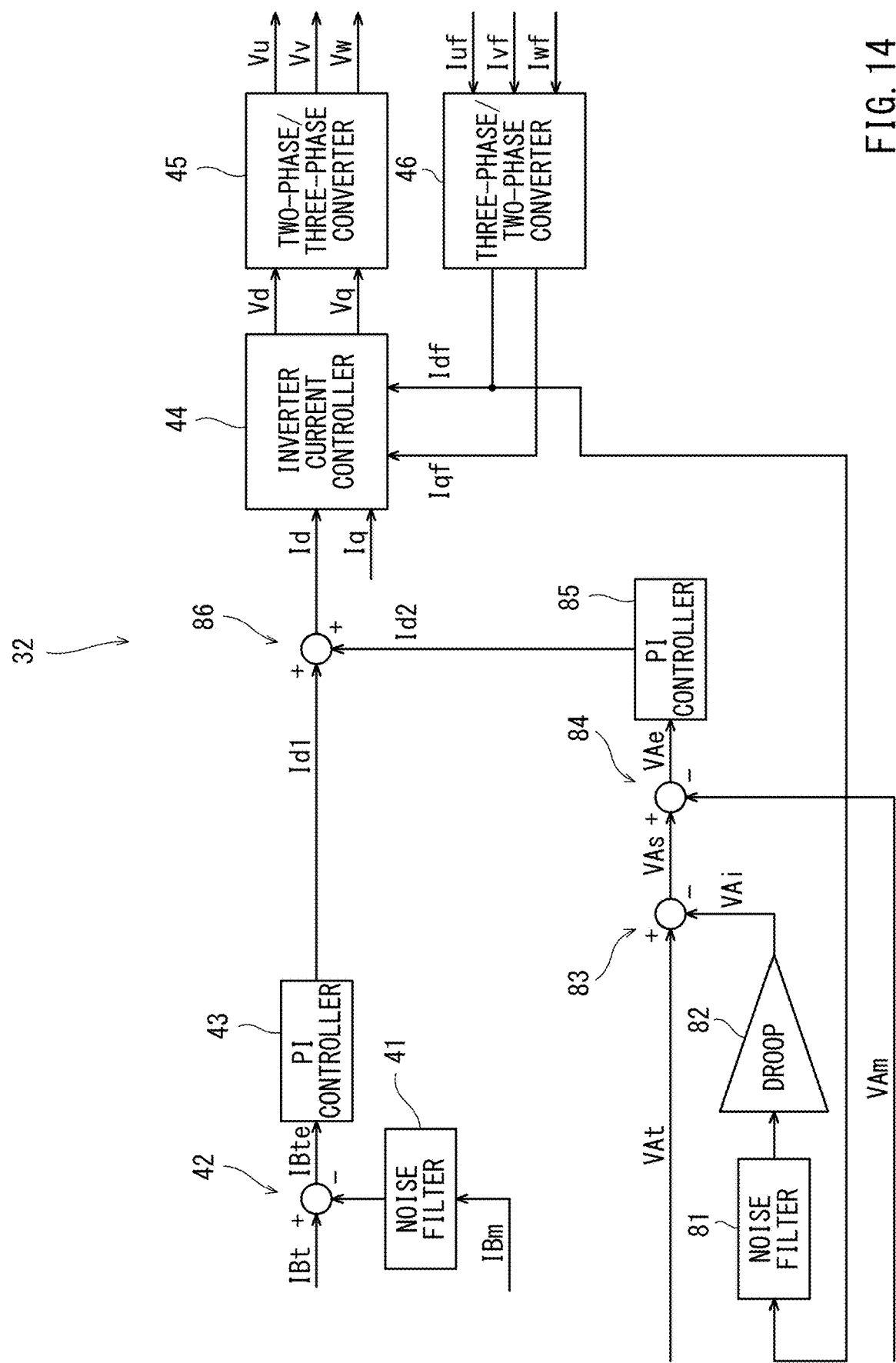
FIG. 14 is a block diagram showing the configuration of the inverter controller of the power supply system according to Embodiment 6 of the present application.

FIG. 14 is a block diagram showing the configuration of the inverter controller 32 of the power supply system according to Embodiment 6 of the present application.

As shown in FIG. 14, the inverter controller 32 of Embodiment 6 corresponds to the inverter controller 32 of Embodiment 1 and further includes the noise filter 81, the drooping unit 82, the subtracter 83, the subtracter 84, the PI controller 85, and an adder 86. The configurations and operations of the noise filter 41, the subtracter 42, and the PI controller 43 are the same as those of Embodiment 1. Herein, the d-axis current command value output from the PI controller 43 is represented by a first d-axis current command value Id1.

The noise filter 81 eliminates the noise of the d-axis current Idf converted by the three-phase/two-phase converter 46. The drooping unit 82 converts the d-axis current Idf, from which the noise has been eliminated, into the target AC voltage value VAi corresponding to the d-axis current in accordance with the drooping characteristic.

The subtracter 83 generates the total target AC voltage value VAs by subtracting the target AC voltage value VAi corresponding to the d-axis current from the predetermined target AC voltage value VAt that is the reference voltage of the AC power system 10.

The subtracter 84 generates the voltage deviation VAe by subtracting the AC power system voltage VAm, measured by the AC power system voltmeter 71, from the total target AC voltage value VAs.

The PI controller 85 generates a second d-axis current command value Id2 by subjecting the voltage deviation VAe to the PI control.

The adder 86 generates the d-axis current command value Id by adding the second d-axis current command value Id2 to the first d-axis current command value Id1.

Since subsequent processing is the same as that of the inverter controller 32 of Embodiment 1, the explanation thereof is omitted.

According to the second control of Embodiment 6 configured as above, in a process in which the DC power of the DC power system 20 and the AC power of the AC power system 10 are mutually converted such that the battery current IBm coincides with the predetermined target current value IBt, the d-axis current that suppresses the fluctuation of the voltage VAm of the AC power system 10 in accordance with the fluctuation of the voltage VAm is output from or input to the AC side of the power supply inverter 31. This is because when the voltage VAm of the AC power system 10 fluctuates to deviate from the target AC voltage value VAt, the d-axis current that cancels this fluctuation is output from or input to the AC side of the power supply inverter 31. The d-axis current represents the active electric power.

As a result, the fluctuation of the voltage VAm of the AC power system 10 is suppressed.

As described above, according to Embodiment 6, the load fluctuation is shared with the power generator 12, and the load fluctuation of the power generator 12 driven by the engine and the fluctuation of the voltage VAm of the AC power system 10 can be suppressed.

Other Embodiments

In Embodiments 1 to 5, the converter 25 and the converter controller 33 may be omitted. Even in this case, the fluctuation of the voltage of the DC power system 20 due to the load fluctuation can be suppressed.

In Embodiments 1 to 6, for example, the second control of extracting only a fluctuation component from the measured value of the frequency of the AC power system 10 through a high-pass filter and controlling the fluctuation component to zero may be added.

From the foregoing description, numerous modifications and other embodiments of the present disclosure are obvious to those skilled in the art. Accordingly, the foregoing description is to be construed as illustrative only.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

An electric power control system according to one aspect of the present application includes: a bidirectional electric power converter including an AC terminal and a DC terminal, the AC terminal being connected to an AC power system, the DC terminal being connected to a DC power system to which one or more DC power loads are connected, the bidirectional electric power converter mutually converting AC power of the AC power system and DC power of the DC power system; an electric power storage that is connected to the DC power system and stores electric power of the DC power system; and a bidirectional electric power conversion controller that performs first control of controlling an output or input of the AC terminal of the bidirectional electric power converter such that a charge current, discharge current, charge electric power, or discharge electric power of the electric power storage coincides with a predetermined target current value or a predetermined target electric power value. Herein, "controlling an output or input of the AC terminal of the bidirectional electric power converter" denotes controlling voltage output, current output, electric power output, voltage input, current input, or electric power input of the AC terminal of the bidirectional electric power converter.

According to this configuration, when sudden load fluctuation occurs at the DC power load, the electric power storage is charged or discharged such that the fluctuation of the voltage of the DC power system due to the sudden load fluctuation is canceled. With this, the fluctuation of the voltage of the DC power system is suppressed. On the other hand, in this period of time, the bidirectional electric power conversion controller controls the output or input of the AC terminal of the bidirectional electric power converter such that the charge current, discharge current, charge electric power, or discharge electric power of the electric power storage coincides with a predetermined target current value or a predetermined target electric power value. Therefore, the charging or discharging of the electric power storage due to the sudden load fluctuation of the DC power load converges after the charging or discharging by which the charge current, discharge current, charge electric power, or discharge electric power of the electric power storage coincides with a stationary predetermined target current value or a stationary predetermined target electric power value converges. As a result, the DC power of the DC power system and the AC power of the AC power system converge in a stationary state after the charging or discharging by which the charge current, discharge current, charge electric power, or discharge electric power of the electric power storage coincides with a stationary predetermined target current value or a stationary predetermined target electric power value converges. With this, the influence of the sudden load fluctuation of the DC power load on the AC power system is suppressed. Moreover, a ratio at which the electric power storage absorbs the load fluctuation (a ratio between the load fluctuation absorbed by the electric power storage and the load fluctuation absorbed by an electric power source (for example, the power generator) of the AC power system) can be adjusted by adjusting the response speed of the bidirectional electric power conversion controller.

The predetermined target current value or the predetermined target electric power value may be zero.

According to this configuration, the charge rate of the electric power storage is maintained constant.

When a charge rate of the electric power storage becomes a predetermined target charge rate, the bidirectional electric power conversion controller may set the predetermined target current value or the predetermined target electric power value to zero.

According to this configuration, the charge rate of the electric power storage can be maintained at the predetermined target charge rate.

When the charge rate of the electric power storage falls below a predetermined dead zone lower limit charge rate that is lower than the target charge rate, the bidirectional electric power conversion controller may set the predetermined target current value or the predetermined target electric power value to a target current value of the charge current or a target electric power value of the charge electric power.

According to this configuration, when the charge rate of the electric power storage decreases by discharging, the charge rate of the electric power storage can be made to return to the predetermined target charge rate without the generation of hunting.

When the charge rate of the electric power storage exceeds a predetermined dead zone upper limit charge rate that is higher than the target charge rate, the bidirectional electric power conversion controller may set the predetermined target current value or the predetermined target electric power value to a target current value of the discharge current or a target electric power value of the discharge electric power.

According to this configuration, when the charge rate of the electric power storage increases by charging, the charge rate of the electric power storage can be made to return to the predetermined target charge rate without the generation of hunting.

The electric power storage may include: an electric power storage device that stores the electric power of the DC power system; and a DC/DC converter that controls a ratio of an increase or decrease of a voltage of the electric power storage device such that a voltage of the DC power system is maintained at a predetermined target voltage value.

According to this configuration, when the fluctuation of the voltage of the DC power system occurs due to the sudden load fluctuation of the DC power load, the DC/DC converter controls the ratio of the increase or decrease of the voltage of the electric power storage device such that the voltage of the DC power system is maintained at the predetermined target voltage value. Therefore, the voltage of the DC power system quickly returns to the predetermined target voltage value.

The electric power storage may include an electric power storage device that is directly connected to the DC power system and stores the electric power of the DC power system.

According to this configuration, when the sudden load fluctuation occurs at the DC power load, the electric power storage device is charged or discharged such that the fluctuation of the voltage of the DC power system due to the sudden load fluctuation is canceled. With this, the fluctuation of the voltage of the DC power system is suppressed.

The bidirectional electric power conversion controller may perform second control of controlling the output or input of the AC terminal of the bidirectional electric power converter so as to suppress a fluctuation of at least one of electric power, voltage, current, or frequency of the AC power system such that the second control is superimposed on the first control. Herein, the above expression "the second control is superimposed on the first control" denotes that "the output or input of the AC terminal of the bidirectional electric power converter is controlled such that: the charge current, discharge current, charge electric power, or discharge electric power of the electric power storage coincides with the predetermined target current value or the predetermined target electric power value; and the fluctuation of at least one of the electric power, voltage, current, or frequency of the AC power system is suppressed." Moreover, the cause of "the fluctuation of at least one of the electric power, voltage, current, or frequency of the AC power system" is not especially limited, and examples of the cause include the AC power load of the AC power system and the DC power load of the DC power system 20.

According to this configuration, the fluctuation of at least one of the electric power, voltage, current, or frequency of the AC power system can be suppressed by the second control.

A response of the second control may be faster than a response of the first control.

When the AC load fluctuates, and the bidirectional electric power converter absorbs this fluctuation, this load fluctuation is absorbed by the electric power storage through the bidirectional electric power converter. However, if the electric power storage tries to absorb this load fluctuation after the charge current, discharge current, charge electric power, or discharge electric power of the electric power storage converges by the first control so as to coincide with the predetermined target current value or the predetermined target electric power value, the charge current, discharge current, charge electric power or discharge electric power is maintained at the predetermined target current value or the predetermined target electric power value, and therefore, the first control cancels the second control, and the electric power storage cannot absorb the load fluctuation. However, according to this configuration, since the response of the second control is faster than the response of the first control, the first control does not cancel the second control, and the electric power storage can absorb the fluctuation of the AC load.

The second control may include controlling the output or input of the AC side of the bidirectional electric power converter so as to suppress the fluctuation of the frequency of the AC power system by feedback of active electric power output from or input to the AC side of the bidirectional electric power converter.

According to this configuration, the active electric power that suppresses the fluctuation of the frequency of the AC power system in accordance with the fluctuation of the frequency is output from or input to the AC side of the bidirectional electric power converter, and with this, the fluctuation of the frequency is suppressed.

The second control may include controlling the output or input of the AC side of the bidirectional electric power converter so as to suppress the fluctuation of the voltage of the AC power system by feedback of reactive electric power or active electric power output from or input to the AC side of the bidirectional electric power converter.

According to this configuration, the active electric power or reactive electric power that suppresses the fluctuation of the voltage of the AC power system in accordance with the fluctuation of the voltage is output from or input to the AC side of the bidirectional electric power converter, and with this, the fluctuation of the voltage is suppressed.

Moreover, a power supply system according to another aspect of the present application includes any one of the above electric power control systems, the AC power system, and the DC power system.

According to this configuration, the influence of the sudden load fluctuation of the DC power load on the AC power system can be suppressed.

INDUSTRIAL APPLICABILITY

The electric power control system and the power supply system of the present application are useful as an electric power control system and a power supply system, each of which is able to, when sudden load fluctuation occurs at a general DC power load, suppress an influence of the load fluctuation on an AC power system.

The invention claimed is:
1. An electric power control system comprising:
a bidirectional electric power converter including an AC terminal and a DC terminal, the AC terminal being connected to an AC power system, the DC terminal being connected to a DC power system to which one or more DC power loads are connected, the bidirectional electric power converter mutually converting AC power of the AC power system and DC power of the DC power system;
an electric power storage that is connected to the DC power system and stores electric power of the DC power system; and a bidirectional electric power conversion controller that performs first control of controlling an output or input of the AC terminal of the bidirectional electric power converter such that a charge current, discharge current, charge electric power, or discharge electric power of the electric power storage coincides with a predetermined target current value or a predetermined target electric power value, wherein the bidirectional electric power conversion controller performs second control of controlling the output or input of the AC terminal of the bidirectional electric power converter to suppress a fluctuation of at least one of electric power, voltage, current, or frequency of the AC power system such that the second control is superimposed on the first control.

2. The electric power control system according to claim 1, wherein the predetermined target current value or the predetermined target electric power value is zero.

3. The electric power control system according to claim 1, wherein when a charge rate of the electric power storage becomes a predetermined target charge rate, the bidirectional electric power conversion controller sets the predetermined target current value or the predetermined target electric power value to zero.

4. The electric power control system according to claim 3, wherein when the charge rate of the electric power storage falls below a predetermined dead zone lower limit charge rate that is lower than the target charge rate, the bidirectional electric power conversion controller sets the predetermined target current value or the predetermined target electric power value to a target current value of the charge current or a target electric power value of the charge electric power.

5. The electric power control system according to claim 3, wherein when the charge rate of the electric power storage exceeds a predetermined dead zone upper limit charge rate that is higher than the target charge rate, the bidirectional electric power conversion controller sets the predetermined target current value or the predetermined target electric power value to a target current value of the discharge current or a target electric power value of the discharge electric power.

6. The electric power control system according to claim 1, wherein the electric power storage includes:
   an electric power storage device that stores the electric power of the DC power system; and
   a DC/DC converter that controls a ratio of an increase or decrease of a voltage of the electric power storage device such that a voltage of the DC power system is maintained at a predetermined target voltage value.

7. The electric power control system according to claim 1, wherein the electric power storage includes an electric power storage device that is directly connected to the DC power system and stores the electric power of the DC power system.

8. The electric power control system according to claim 1, wherein a response of the second control is faster than a response of the first control.

9. The electric power control system according to claim 1, wherein the second control includes controlling the output or input of the AC side of the bidirectional electric power converter so as to suppress the fluctuation of the frequency of the AC power system by feedback of active electric power output from or input to the AC side of the bidirectional electric power converter.

10. The electric power control system according to claim 1, wherein the second control includes controlling the output or input of the AC side of the bidirectional electric power converter so as to suppress the fluctuation of the voltage of the AC power system by feedback of reactive electric power or active electric power output from or input to the AC side of the bidirectional electric power converter.

11. A power supply system comprising:
   the electric power control system according to claim 1;
   the AC power system; and
   the DC power system.

* * * * *